United States Patent
Babaei et al.

(10) Patent No.: US 10,582,454 B2
(45) Date of Patent: Mar. 3, 2020

(54) POWER CONTROL FOR UPLINK CONTROL CHANNEL

(71) Applicants: Alireza Babaei, Fairfax, VA (US);
Esmael Dinan, Herndon, VA (US);
Hua Zhou, Herndon, VA (US);
Hyoungsuk Jeon, Centreville, VA (US);
Kyungmin Park, Herndon, VA (US)

(72) Inventors: Alireza Babaei, Fairfax, VA (US);
Esmael Dinan, Herndon, VA (US);
Hua Zhou, Herndon, VA (US);
Hyoungsuk Jeon, Centreville, VA (US);
Kyungmin Park, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/142,959

(22) Filed: Sep. 26, 2018

(65) Prior Publication Data
US 2019/0098580 A1    Mar. 28, 2019

Related U.S. Application Data

(60) Provisional application No. 62/563,916, filed on Sep. 27, 2017.

(51) Int. Cl.
*H04W 52/10*    (2009.01)
*H04W 52/14*    (2009.01)
(Continued)

(52) U.S. Cl.
CPC ....... *H04W 52/146* (2013.01); *H04W 52/365* (2013.01); *H04W 52/367* (2013.01);
(Continued)

(58) Field of Classification Search
CPC . H04W 52/146; H04W 52/34; H04W 52/365; H04W 52/367; H04W 72/10; H04W 72/0473; H04W 72/1284
(Continued)

(56) References Cited

U.S. PATENT DOCUMENTS 8,873,439 B2 * 10/2014 Ji ..................... H04L 5/0007
                                                      370/310
8,989,123 B2 *  3/2015 Yin ................. H03M 13/6525
                                                      370/329
(Continued)

OTHER PUBLICATIONS

3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation.
(Continued)

*Primary Examiner* — Hai V Nguyen
(74) *Attorney, Agent, or Firm* — David Grossman; Kavon Nasabzadeh; Philip Smith

(57) ABSTRACT

A wireless device receives message(s) indicating: a first resource for a first uplink control channel and a second resource for a second uplink control channel of a cell. The first resource and the second resource overlap in symbol duration(s). A first power level is determined for transmission of first uplink control information via the first resource. A second power level is determined for transmission of second uplink control information via the second resource. The first power level is scaled based on a first scaling factor. The first scaling factor is determined based on a first priority of the first uplink control channel. The second power level is scaled based on a second scaling factor. The second scaling factor is determined based on a second priority of the second uplink control channel. A sum of the power levels is larger than an allowed transmission power.

20 Claims, 18 Drawing Sheets

(51) Int. Cl.
    *H04W 52/36*    (2009.01)
    *H04W 72/04*    (2009.01)
    *H04W 72/10*    (2009.01)
    *H04W 72/12*    (2009.01)
    *H04W 52/34*    (2009.01)

(52) U.S. Cl.
    CPC ....... *H04W 72/0473* (2013.01); *H04W 72/10* (2013.01); *H04W 52/34* (2013.01); *H04W 72/1284* (2013.01)

(58) Field of Classification Search
    USPC ......................................................... 455/522
    See application file for complete search history.

(56) References Cited

U.S. PATENT DOCUMENTS

| | | | | |
|---|---|---|---|---|
| 9,197,367 | B2* | 11/2015 | Yamada | H04L 1/0073 |
| 9,215,729 | B2* | 12/2015 | Ostergaard | H04W 72/1284 |
| 9,288,765 | B2* | 3/2016 | Liu | H04W 52/0206 |
| 9,363,765 | B2* | 6/2016 | Kazmi | H04W 52/281 |
| 9,398,541 | B2* | 7/2016 | Wu | H04W 52/246 |
| 9,635,654 | B2* | 4/2017 | Hwang | H04L 1/1861 |
| 9,706,505 | B2* | 7/2017 | Pietraski | H04L 5/001 |
| 9,735,946 | B2* | 8/2017 | Ji | H04L 5/0007 |
| 9,763,199 | B2* | 9/2017 | Pelletier | H04W 52/146 |
| 10,080,234 | B2* | 9/2018 | Ostergaard | H04W 72/0446 |
| 10,243,773 | B1* | 3/2019 | Shattil | H04L 27/2614 |
| 10,271,288 | B2* | 4/2019 | Pelletier | H04W 52/146 |
| 2011/0188422 | A1* | 8/2011 | Ostergaard | H04W 72/1284 370/311 |
| 2011/0275381 | A1* | 11/2011 | Moberg | H04W 72/0406 455/450 |
| 2013/0218642 | A1* | 8/2013 | Tirosh | G06Q 10/0637 705/7.36 |
| 2013/0337862 | A1* | 12/2013 | Liu | H04W 52/0206 455/522 |
| 2015/0063262 | A1* | 3/2015 | Ji | H04L 5/0007 370/329 |
| 2015/0111608 | A1* | 4/2015 | Kazmi | H04W 52/281 455/522 |
| 2015/0223178 | A1* | 8/2015 | Pietraski | H04L 5/001 370/252 |
| 2016/0066341 | A1* | 3/2016 | Ostergaard | H04W 72/1284 370/329 |
| 2016/0255593 | A1* | 9/2016 | Blankenship | H04W 52/146 370/328 |
| 2017/0013565 | A1* | 1/2017 | Pelletier | H04W 72/0473 |
| 2017/0223694 | A1* | 8/2017 | Han | H04W 16/32 |
| 2018/0014255 | A1* | 1/2018 | Pelletier | H04W 52/343 |
| 2018/0294938 | A1* | 10/2018 | Munier | H04L 5/0053 |
| 2018/0317180 | A1* | 11/2018 | Li | H04W 52/242 |
| 2018/0368162 | A1* | 12/2018 | Ostergaard | H04W 72/1284 |
| 2019/0044639 | A1* | 2/2019 | Ouchi | H04J 11/0073 |
| 2019/0159134 | A1* | 5/2019 | Wang | H04W 16/14 |
| 2019/0159140 | A1* | 5/2019 | Wang | H04W 16/14 |

OTHER PUBLICATIONS

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding; (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures; (Release 14).
3GPP TS 36.300 V14.3.0 (Jun. 2017); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;; Stage 2.
3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 14).
3GPP TS 36.331 V14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification.
3GPP TS 38.211 V0.2.0 (Aug. 2017); Technical Specification; 3rd Generation Partnership Project; Technical Specification Group Radio Access Network; NR; Physical channels and modulation; (Release 15).
3GPP TS 38.212 V0.1.0 (Aug. 2017); Technical Specification; 3rd Generation Partnership Project; Technical Specification Group Radio Access Network; NR; Multiplexing and channel coding; (Release 15).
3GPP TS 38.214 V0.1.0 (Aug. 2017); Technical Specification; 3rd Generation Partnership Project; Technical Specification Group Radio Access Network; NR; Physical layer procedures for data (Release 15).
3GPP TS 38.321 V1.0.0 (Sep. 2017); Technical Specification; 3rd Generation Partnership Project; Technical Specification Group Radio Access Network; NR; Medium Access Control (MAC) protocol specification; (Release 15).
R1-1715399; 3GPP TSG RAN WG1 Meeting AH_NR#3; Nagoya, Japan, Sep. 18-21, 2017; ; Agenda Item:6.3.2.1.1; Source:Huawei, HiSilicon; Title:Short PUCCH for UCI of up to 2 bits.
R1-1715454 On NR power control; 3GPP TSG RAN WG1 Meeting NR#3; Nagoya, Japan, Sep. 18-21, 2017; Source:ZTE, Sanechips; Title: On NR Power Control; Agenda Item: 6.7.1; Document for: Discussion and Decision.
R1-1715478 Huawei; 3GPP TSG RAN WG1 Meeting NR#3; Nagoya, Japan, Sep. 18-21, 2017; Agenda Item:6.7.1; Source:Huawei, HiSilicon; Title:General considerations on UL power control design.
R1-1715505; 3GPP TSG-RAN WG1 NR adhoc #3; Nagoya, Japan, Sep. 18-21, 2017; ; Source: Mitsubishi Electric; Title:UL transmission power control; Agenda Item:6.7.1 NR power control framework.
R1-1715522 On short PUCCH for up to 2 bits UCI; 3GPP TSG RAN WG1 Meeting AH_NR#3; Nagoya, Japan, Sep. 18-21, 2017; Source: ZTE, Sanechips; Title:On short PUCCH for up to 2 bits UCI; Agenda item:6.3.2.1.1; Document for:Discussion and Decision.
R1-1715635 Design of short-PUCCH for UCI up to 2 bits; 3GPP TSG RAN WG1 NR Ad Hoc #3R1-1715635 Nagoya, Japan, Sep. 18-21, 2017; Source:vivo; Title:Design of short-PUCCH for UCI up to 2 bits; Agenda Item:6.3.2.1.1.
R1-1715651 NR UL power control framework; 3GPP TSG RAN WG1 NR Ad Hoc #3; Nagoya, Japan, Sep. 18-21, 2017; Source:vivo; Title:NR UL power control framework; Agenda Item:6.7.1.
R1-1715675; 3GPP TSG RAN WG1 Meeting NR#3; Nagoya, Japan, Sep. 18-21, 2017; Source: Guangdong OPPO Mobile Telecom; Title:Uplink power control mechanism for NR; Agenda Item:6.7.1.
R1-1715680; 3GPP TSG RAN WG1 Meeting NR#3; Nagoya, Japan, Sep. 18-21, 2017; Source: Guangdong OPPO Mobile Telecom; Title:Short-PUCCH for up to 2 UCI bits; Agenda Item:6.3.2.1.1.
R1-1715817; 3GPP TSG RAN WG1 Meeting NR#3; Nagoya, Japan, Sep. 18-21, 2017; Source:CATT; Title:On short PUCCH formats supporting up to two UCI bits.
R1-1715838_Power Control framework CATT; 3GPP TSG RAN WG1 RAN1 NR AH#3; Nagoya, Japan Sep. 18-21, 2017; ; Source:CATT; Title:NR Power Control Framework.
R1-1715876; 3GPP TSG RAN WG1 Meeting NR#3; Nagoya, Japan, Sep. 18-21, 2017; Agenda Item:6.3.2.1.1; Source: LG Electronics; Title: Design of short PUCCH for UCI of up to 2 bits for NR.
R1-1715902 NR UL PC_final LG; 3GPP TSG RAN WG1 Meeting NR#3 R1-1715902 Nagoya, Japan, Sep. 18-21, 2017; ; Agenda Item:6.7.1; Source: LG Electronics; Title: Discussion on UL power control for NR.
R1-1716040 Power control framework-Samsung; 3GPP TSG RAN WG1 Meeting NR#3 R1-1716040 Nagoya, Japan Sep. 18-21, 2017;

(56) References Cited

OTHER PUBLICATIONS

Agenda item:6.7; Source:Samsung; Title:On UL Power Control; Document for:Discussion and Decision.
R1-1716061; 3GPP TSG RAN WG1 Meeting NR#3R1-1716061 Nagoya, Japan, Sep. 18-21, 2017; ; Source:CMCC; Title:Discussion on power control framework; Agenda Item:6.7.1.
R1-1716098; 3GPP TSG RAN WG1 Meeting NR Ad-Hoc#3; Nagoya, Japan, Sep. 18-21, 2017; ; Source:NTT Docomo, Inc.; Title:Short-PUCCH for UCI of up to 2 bits; Agenda Item:6.3.2.1.1.
R1-1716099; 3GPP TSG RAN WG1 Meeting NR Ad-Hoc#3; Nagoya, Japan, Sep. 18-21, 2017; ; Source:NTT Docomo, Inc.; Title:Short-PUCCH for UCI of more than 2 bits; Agenda Item:6.3.2.1.2.
R1-1716114_Power control framework for PUSCH_r2; 3GPP TSG RAN WG1 NR Ad-Hoc Meeting R1-1716114 Nagoya, Japan, Sep. 18-21, 2017; Agenda item:6.7.1; Source: NTT Docomo, Inc.; Title:Power control framework for PUSCH; Document for:Discussion and Decision.
R1-1716119; 3GPP TSG RAN WG1 Meeting NR-AH#3; Nagoya, Japan, Sep. 18-21, 2017; ; Source:Panasonic; Title: Discussion on 1-symbol short-PUCCH for UCI of up to 2 bits; Agenda Item:6.3.2.1.1.
R1-1716127; 3GPP TSG RAN WG1 Meeting NR#3 ; Nagoya, Japan, Sep. 18-21, 2017; ; Agenda item:6.7.1; Source:Nokia, Nokia Shanghai Bell ; Title: Discussion on NR power control framework.
R1-1716128; 3GPP TSG RAN WG1 Meeting NR#3 ; Nagoya, Japan, Sep. 18-21, 2017; ; Agenda item:6.7.2; Source:Nokia, Nokia Shanghai Bell ; Title: Considerations on Power headroom report in NR.
R1-1716139 short PUCCH for small UCI; 3GPP TSG RAN WG1 NR Ad-Hoc #3 R1-1716139 Nagoya, Japan, Sep. 18-21, 2017; ; Agenda item:6.3.2.1.1; Source:Nokia, Nokia Shanghai Bell; Title: Remaining details of short PUCCH for UCI up to 2 bits.
R1-1716140_short PUCCH for more than 2 bits; 3GPP TSG RAN WG1 #NR3 R1-1716140 Nagoya, Japan, Sep. 18-21, 2017; ; Agenda item:6.3.2.1.2; Source:Nokia, Nokia Shanghai Bell; Title:On remaining details of short PUCCH for UCI of more than 2 bits.
R1-1716419_Channelization of 1-symbol Short PUCCH with 1 or 2 bits payload; 3GPP TSG RAN WG1 Meeting #90AHR1-1716419 Nagoya, JP Sep. 18-21, 2017; ; Agenda item-6.3.2.1.1; Source: Qualcomm Incorporated; Title: Channelization of 1-symbol short PUCCH with 1 or 2 bits payload.
R1-1716451 Power control and PHR for NR; 3GPP TSG RAN WG1 Meeting NR#3 R1-1716451 Nagoya, Japan, Sep. 18-21, 2017; Agenda item:6.7.1; Source: Qualcomm Incorporated; Title: Power contol and PHR for NR; Document for:Discussion/Decision.
R1-1716478 Sequence design for 1-symbol short-PUCCH of up to 2 bits; 3GPP TSG RAN WG1 Meeting NR#3R1-1716478 Nagoya, Japan, Sep. 18-21, 2017; ; Agenda Item:6.3.2.1.1; Source:InterDigital Inc.; Title:Sequence design for 1-symbol short-PUCCH of up to 2 bits.
R1-1716515 Further Details on Power Control; 3GPP TSG RAN WG1 Meeting NR#3 R1-1716515 Nagoya, Japan, Sep. 18-21, 2017; ; Agenda item:6.7.1; Source: InterDigital Inc.; Title: Further Details on Uplink Power Control.
R1-1716518; 3GPP TSG RAN WG1 Meeting NR#3R1-1716518 Nagoya, Japan, Sep. 18-21, 2017; ; Source:IITH, CEWiT, Reliance Jio, IITM, Tejas Networks; Title:Design of Short PUCCH for UCI up to 2 bits; Agenda Item:6.3.2.1.1.
R1-1716535_NR_PC; 3GPP TSG RAN WG1 Meeting NR-AH#3R1-1716535 Nagoya, Japan, Sep. 18-21, 2017; ; Source:Panasonic; Title: Discussion on NR power control framework; Agenda Item:6.7.1.
R1-1716547 Power control on different SRS groups; 3GPP TSG RAN WG1 Meeting NR#3R1-1716547 Nagoya, Japan, Sep. 18-21, 2017; ; Agenda Item:6.7.1; Source:ASUSTeK; Title:Power control on different SRS groups.
R1-1716604 NR UL power control framework overview; 3GPP TSG-RAN WG1 NR Ad Hoc #3R1-1716604 Nagoya, Japan, Sep. 18-21, 2017; ; Source:Ericsson; Title:NR UL power control framework; Agenda Item:6.7.1.
R1-1716632_Short PUCCH_final; 3GPP TSG RAN WG1 Meeting NR#3R1-1716632 Nagoya, Japan, Sep. 18-21, 2017; ; Source:WILUS Inc.; Title:Discussion on Short PUCCH for UCI of up to 2 bits; Agenda item:6.3.2.1.1.
R1-1716641 Remaining details on short PUCCH for up to 2 bit UCI; 3GPP TSG RAN WG1 NR Ad-Hoc#3R1-1716641 Nagoya, Japan, Sep. 18-21, 2017; ; ; Agenda item:6.3.2.1.1.
R1-1716662; 3GPP TSG RAN WG1 Meeting AH_NR#3R1-1716662; Nagoya, Japan, Sep. 18-21, 2017; ; Agenda Item:6.3.2.1.1; Source: Ericsson.
R1-1716665 Short PUCCH with 1 or 2 bits-Samsung; 3GPP TSG RAN WG1 Meeting NR#3 R1-1716665 Nagoya, Japan Sep. 18-21, 2017; Agenda item:6.3.2.1.1; Source:Samsung; Title:Short PUCCH for UCI of 1 or 2 Bits; Document for:Discussion and Decision.
R1-1716761 Offline summary for AI 6.7 NR UL power control_v2; 3GPP TSG RAN WG1 Meeting NR#3R1-1716761 Nagoya, Japan, Sep. 18-21, 2017; ; Source:ZTE, NTT Docomo; Title: Offline summary for AI 6.7 NR UL power control ; Agenda Item: 6.7.
R1-1716772-rev from R1-1716310; 3GPP TSG RAN WG1 Meeting NR#3R1-1716772 Nagoya, Japan, Sep. 18-21, 2017; ; Source: Intel Corporation; Title:Short PUCCH for UCI up to 2 bits; Agenda item:6.3.2.1.1.
R1-1716857 (LS reply on UE power class and power control); 3GPP TSG-RAN WG1 Meeting NR#3R1-1716857 Nagoya, Japan, Sep. 18-21, 2017; ; Title:[Draft] LS reply to RAN4 on UE Power Class and Power Control; Reply to:R4-1708807 (R1-1715366); Release:Rel-15.
R1-1716869 Session Notes RAN1_NRAH#3 Session 6 7 v002; 3GPP TSG RAN WG1 Meeting NR#3R1-1716869 Nagoya, Japan, Sep. 18-21, 2017; ; Title:RAN1 session notes for 6.7 UL power control.
R1-1716893 LS reply to RAN4 on Beam management impact on power control_v4; 3GPP TSG-RAN WG1 Meeting NR#3R1-1716893 Nagoya, Japan, Sep. 18-21, 2017; ; Title:[Draft] LS reply to RAN4 on Beam management impact on power control; Reply to:R4-1709147 (R1-1715371); Release:Rel-15.
R1-1716914 (Draft LS reply on UE power class and power control); 3GPP TSG-RAN WG1 Meeting NR#3; Nagoya, Japan, Sep. 18-21, 2017; Title: LS reply to RAN4 on UE.
R2-1707748 38300-060; 3GPP TS 38.300 V0.6.0 (Aug. 2017)Technical Specification; 3rd Generation Partnership Project;; Technical Specification Group Radio Access Network;; NR; NR.
R2-1708468 38331-005; 3GPP TS 38.331 V0.0.5 (Aug. 2017) Technical Specification; 3rd Generation Partnership Project;; Technical Specification Group Radio Access Network;; NR,;; R.
R1-1716763; 3GPP TSG RAN WG1 NR Ad-Hoc Meeting Nagoya, Japan; Sep. 18-21, 2017 Agenda item 6.7.1.
R1-1716764; 3GPP TSG RAN WG1 NR Ad-Hoc Meeting; Nagoya, Japan; Sep. 18-21, 2017 Agenda item 6.7.1.
R1-1716766; 3GPP TSG RAN WG1 meeting NR#3; Nagoya, Japan, Sep. 18-21, 2017.
R1-1716818; 3GPP TSG RAN WG1 Meeting NR#3; Nagoya, Japan, 6.3.2.1.1; WF on Evaluation of PUCCH Sequences.
R1-1716878; 3GPP TSG RAN WG1 NR Ad-Hoc #3 ; Nagoya, Japan, Sep. 18-21, 2017; Agenda item 6.7.1 WF on NR Closed-loop Power Control.

* cited by examiner

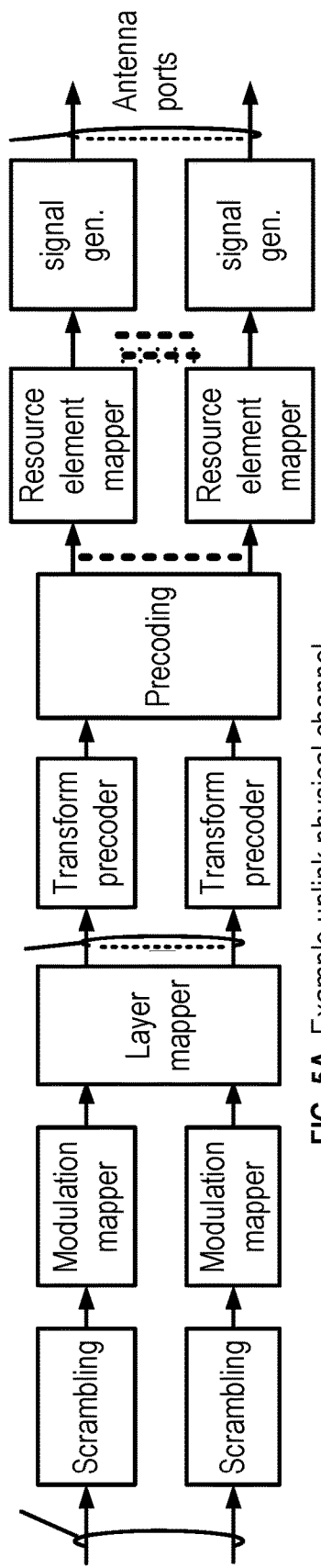
FIG. 5A Example uplink physical channel
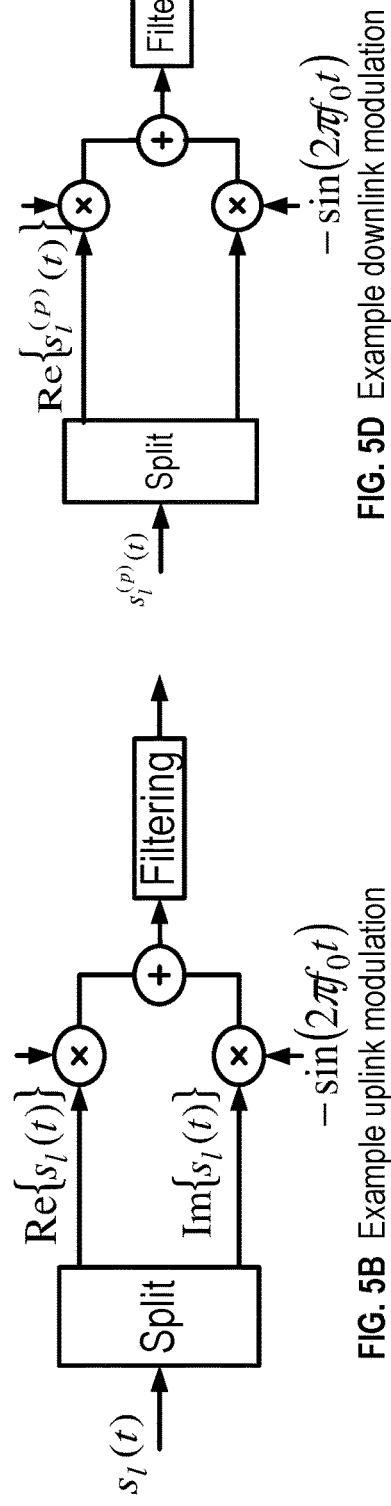
FIG. 5B Example uplink modulation
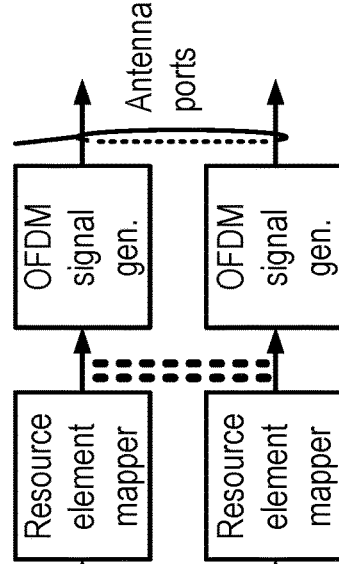
FIG. 5D Example downlink modulation
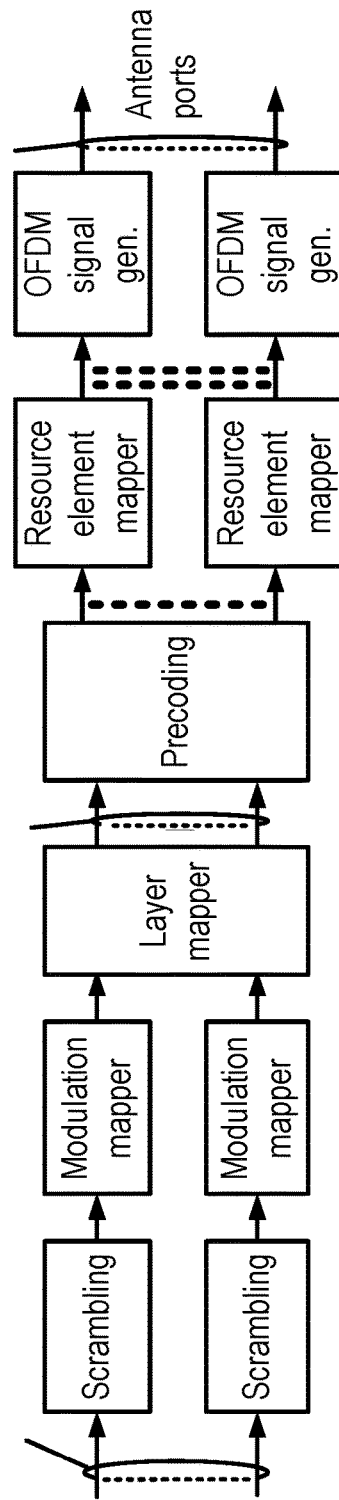
FIG. 5C Example downlink physical channel FIG. 7 Dual-Connectivity- two MAC entities at UE side

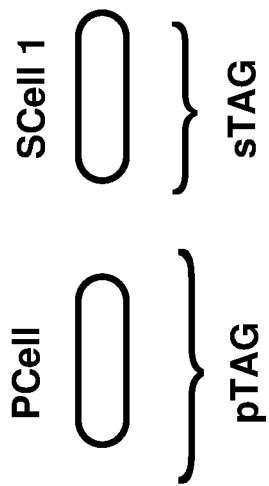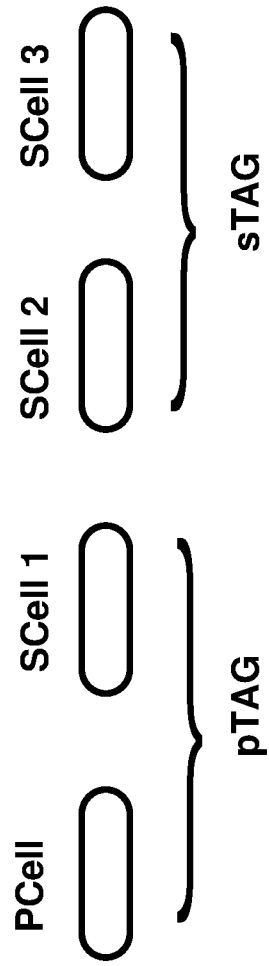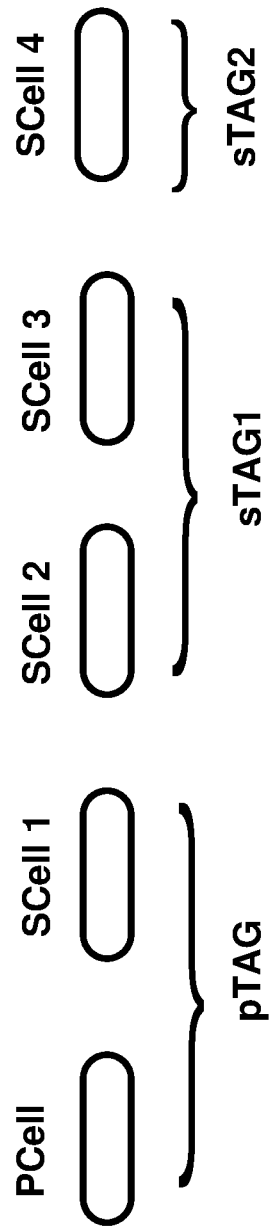
FIG. 8

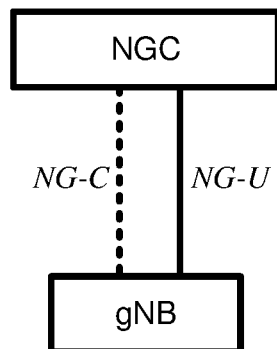
FIG. 10A gNB connected to NGC
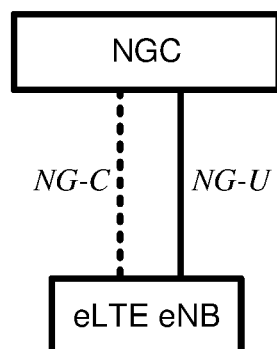
FIG. 10B eLTE eNB connected to NGC

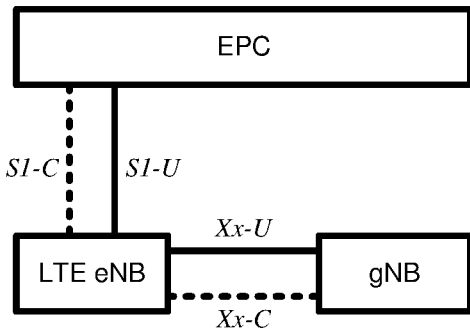

FIG. 11A LTE eNB connected to EPC with non-standalone gNB.
gNB user plane connected to EPC via LTE eNB.

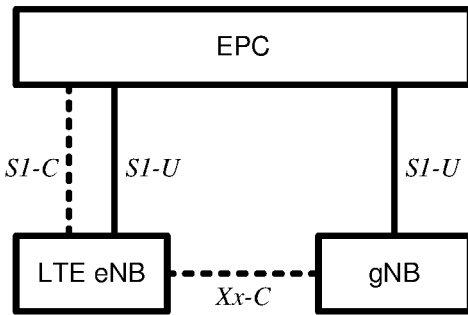

FIG. 11B LTE eNB connected to EPC with non-standalone gNB.
gNB user plane connected to EPC directly.

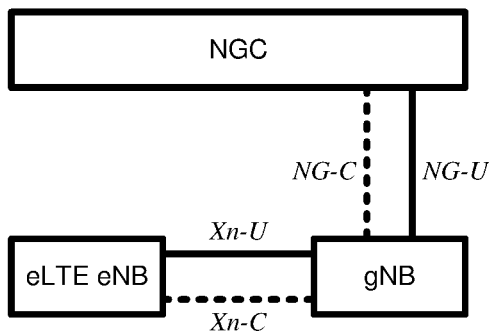

FIG. 11C gNB connected to NGC with non-standalone eLTE eNB.
eLTE eNB user plane connected to NGC via gNB.

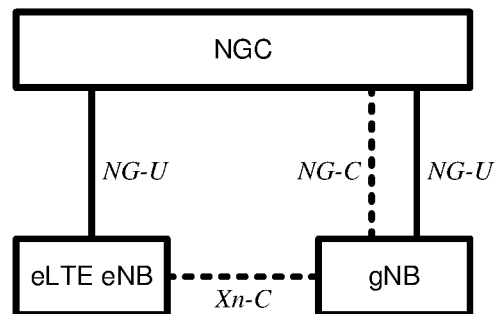

FIG. 11D gNB connected to NGC with non-standalone eLTE eNB.
eLTE eNB user plane connected to NGC directly.

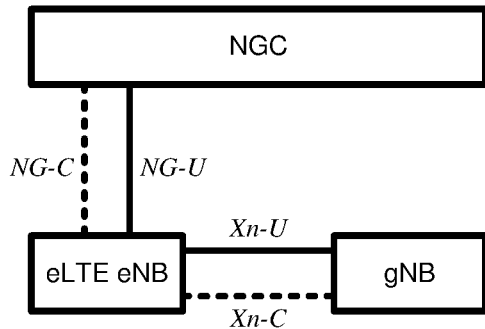

FIG. 11E eLTE eNB connected to NGC with non-standalone gNB.
gNB user plane connected to NGC via eLTE eNB.

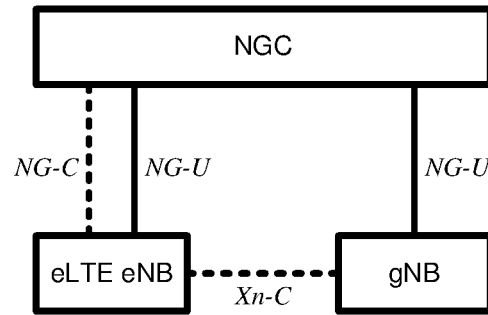

FIG. 11F eLTE eNB connected to NGC with non-standalone gNB.
gNB user plane connected to NGC directly.

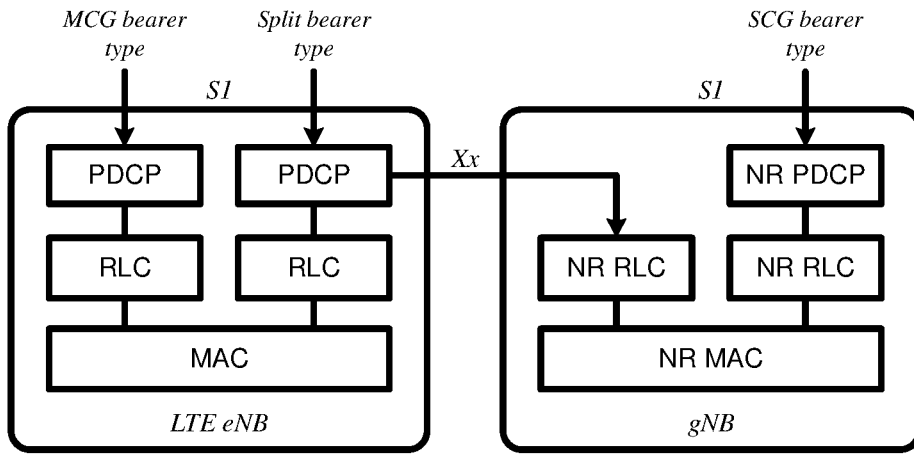
FIG. 12A Radio protocol architecture for split bearer and SCG bearer. LTE eNB connected to EPC with non-standalone gNB.
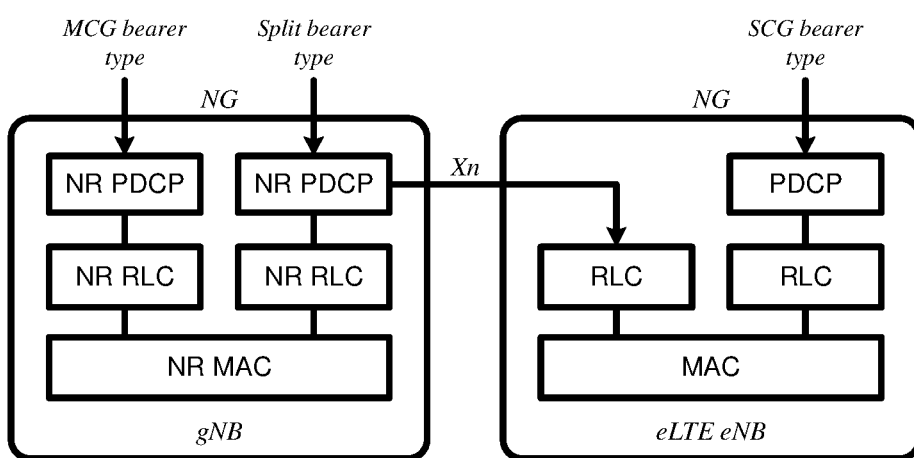
FIG. 12B Radio protocol architecture for split bearer and SCG bearer. gNB connected to NGC with non-standalone eLTE eNB.
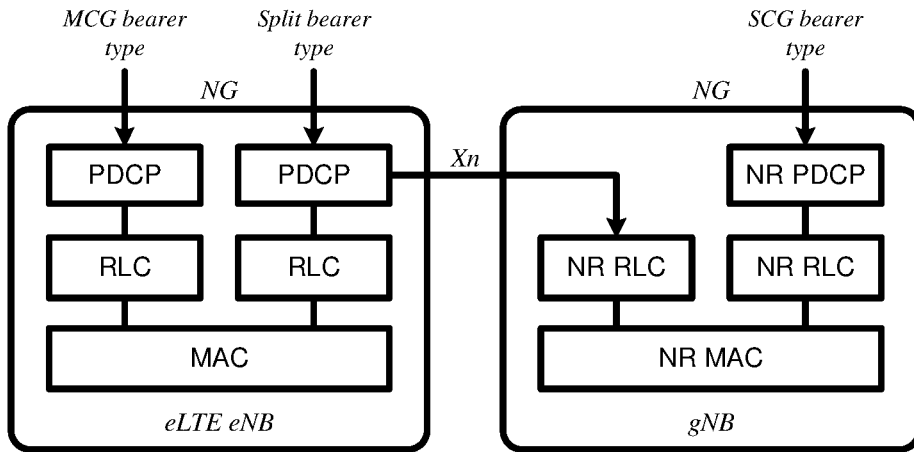
FIG. 12C Radio protocol architecture for split bearer and SCG bearer. eLTE eNB connected to NGC with non-standalone gNB.

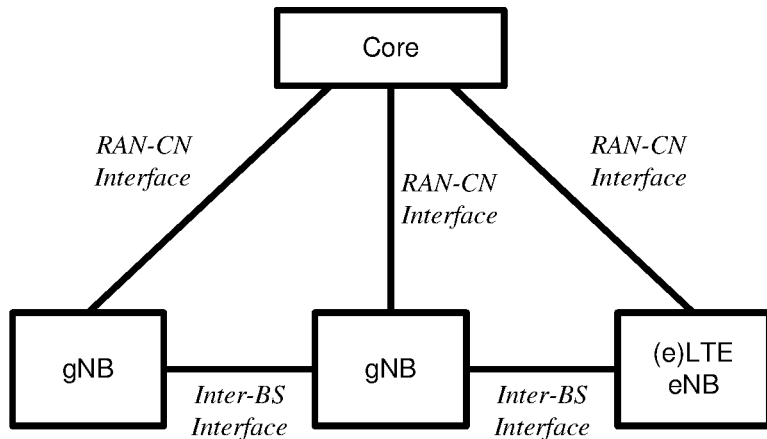
FIG. 13A Non-centralized deployment
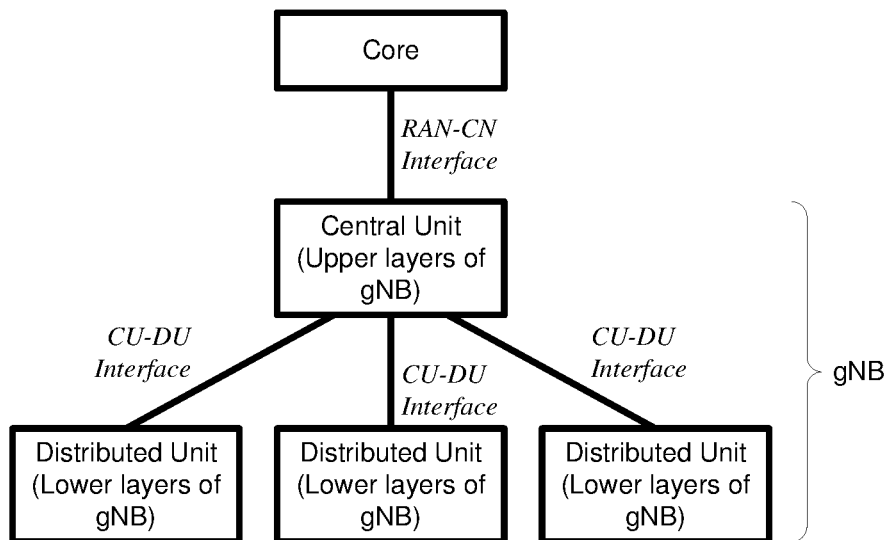
FIG. 13B Centralized deployment

```
┌─────────────────────────────────────────────────────┐
│  Receive, by a wireless device, message(s) indicating a resources
│  comprising: a 1st resource for a 1st uplink control channel of a
│  cell; and a 2nd resource for a 2nd uplink control channel of the
│  cell, where the 1st resource and the 2nd resource overlap in one
│                 or more symbol durations
│                          1810
└─────────────────────────────────────────────────────┘
                             │
                             ▼
┌─────────────────────────────────────────────────────┐
│  Determine power levels comprising: a 1st power level for
│  transmission of 1st uplink control information(s) via the 1st
│  resource; and a 2nd power level for transmission(s) of 2nd uplink
│        control information via the 2nd resource
│                          1820
└─────────────────────────────────────────────────────┘
                             │
                             ▼
┌─────────────────────────────────────────────────────┐
│  Scale the 1st power level based on a 1st scaling factor, where the
│  1st scaling factor is determined based on a 1st priority of the 1st
│                    uplink control channel
│                          1830
└─────────────────────────────────────────────────────┘
                             │
                             ▼
┌─────────────────────────────────────────────────────┐
│  Scale the 2nd power level based on a 2nd scaling factor, wherein
│  the 2nd scaling factor determined based on a 2nd priority of the
│  2nd uplink control channel; and wherein a sum of the power levels
│           is larger than an allowed transmission power
│                          1840
└─────────────────────────────────────────────────────┘
```

FIG. 18

POWER CONTROL FOR UPLINK CONTROL CHANNEL

This application claims the benefit of U.S. Provisional Application No. 62/563,916, filed Sep. 27, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 12A, FIG. 12B, and FIG. 12C are example diagrams for radio protocol structures of tight interworking bearers as per an aspect of an embodiment of the present invention.

FIG. 13A and FIG. 13B are example diagrams for gNB deployment scenarios as per an aspect of an embodiment of the present invention.

FIG. 18 is a flow diagram of an aspect of an embodiment of the present disclosure.

DETAILED DESCRIPTION OF EMBODIMENTS

Figure 1:
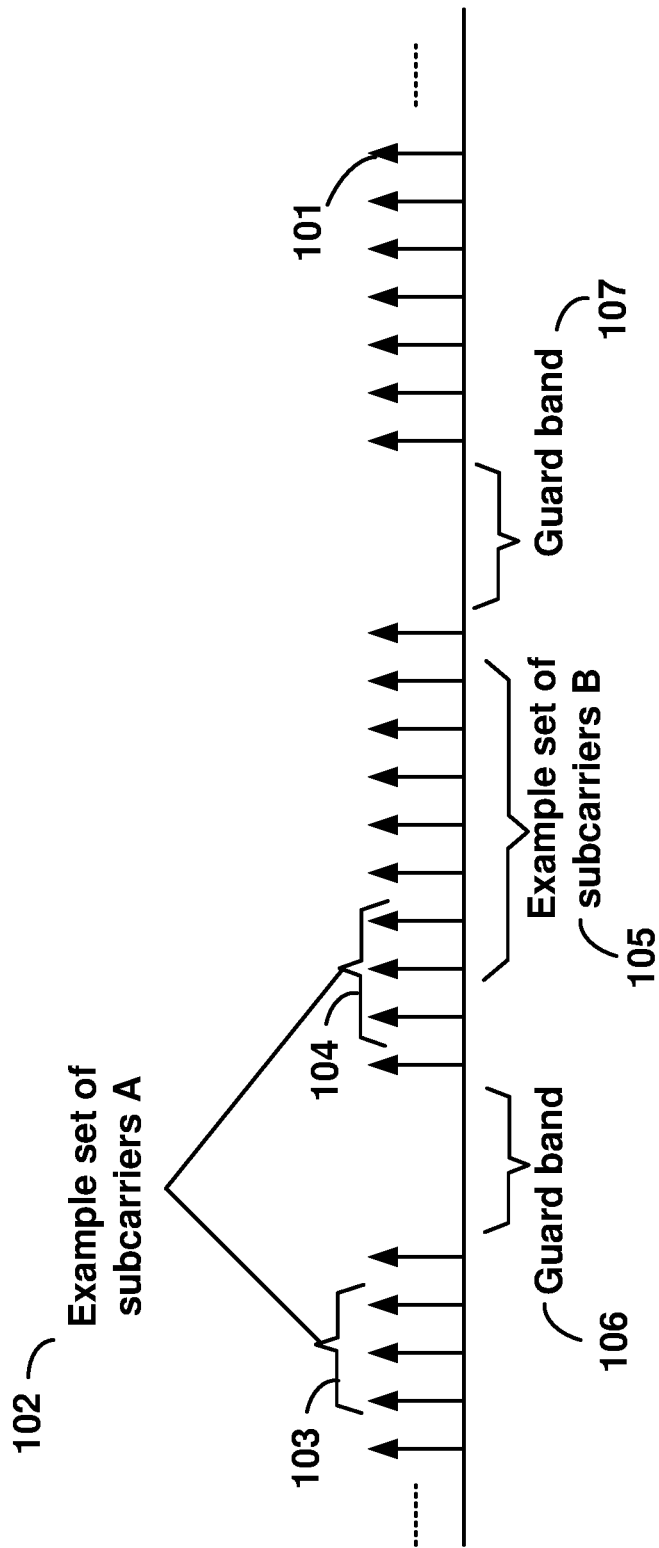
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to power control in a multicarrier communication systems.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| CP | cyclic prefix |
| DL | downlink |
| DCI | downlink control information |
| DC | dual connectivity |
| eMBB | enhanced mobile broadband |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LTE | long term evolution |
| MCG | master cell group |
| MeNB | master evolved node B |
| MIB | master information block |
| MAC | media access control |
| MAC | media access control |
| MME | mobility management entity |
| mMTC | massive machine type communications |
| NAS | non-access stratum |
| NR | new radio |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | resource block groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TTI | transmission time intervalTB transport block |
| UL | uplink |
| UE | user equipment |

| | |
|---|---|
| URLLC | ultra-reliable low-latency communications |
| VHDL | VHSIC hardware description language |
| CU | central unit |
| DU | distributed unit |
| Fs-C | Fs-control plane |
| Fs-U | Fs-user plane |
| gNB | next generation node B |
| NGC | next generation core |
| NG CP | next generation control plane core |
| NG-C | NG-control plane |
| NG-U | NG-user plane |
| NR | new radio |
| NR MAC | new radio MAC |
| NR PHY | new radio physical |
| NR PDCP | new radio PDCP |
| NR RLC | new radio RLC |
| NR RRC | new radio RRC |
| NSSAI | network slice selection assistance information |
| PLMN | public land mobile network |
| UPGW | user plane gateway |
| Xn-C | Xn-control plane |
| Xn-U | Xn-user plane |
| Xx-C | Xx-control plane |
| Xx-U | Xx-user plane |

Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
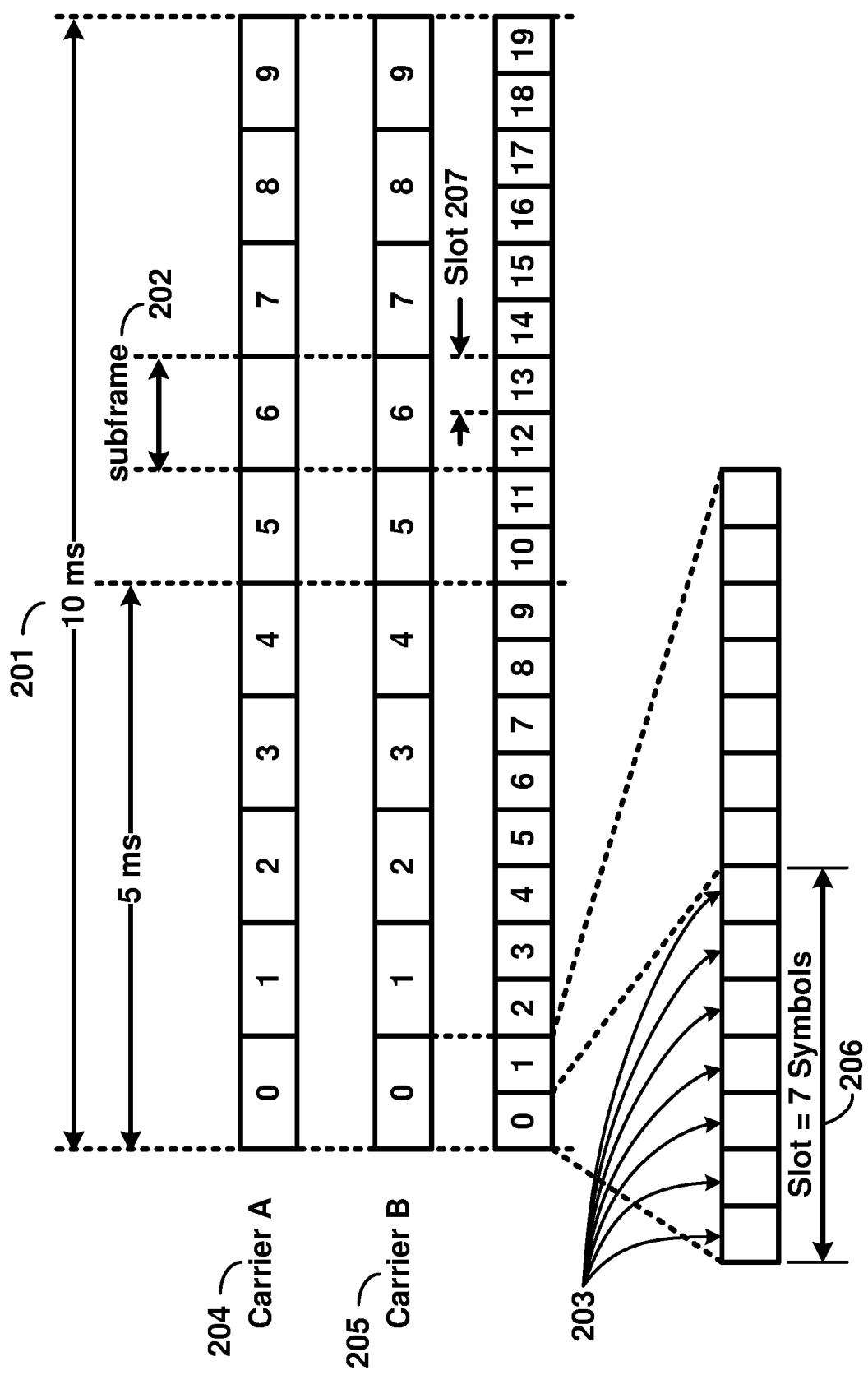
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
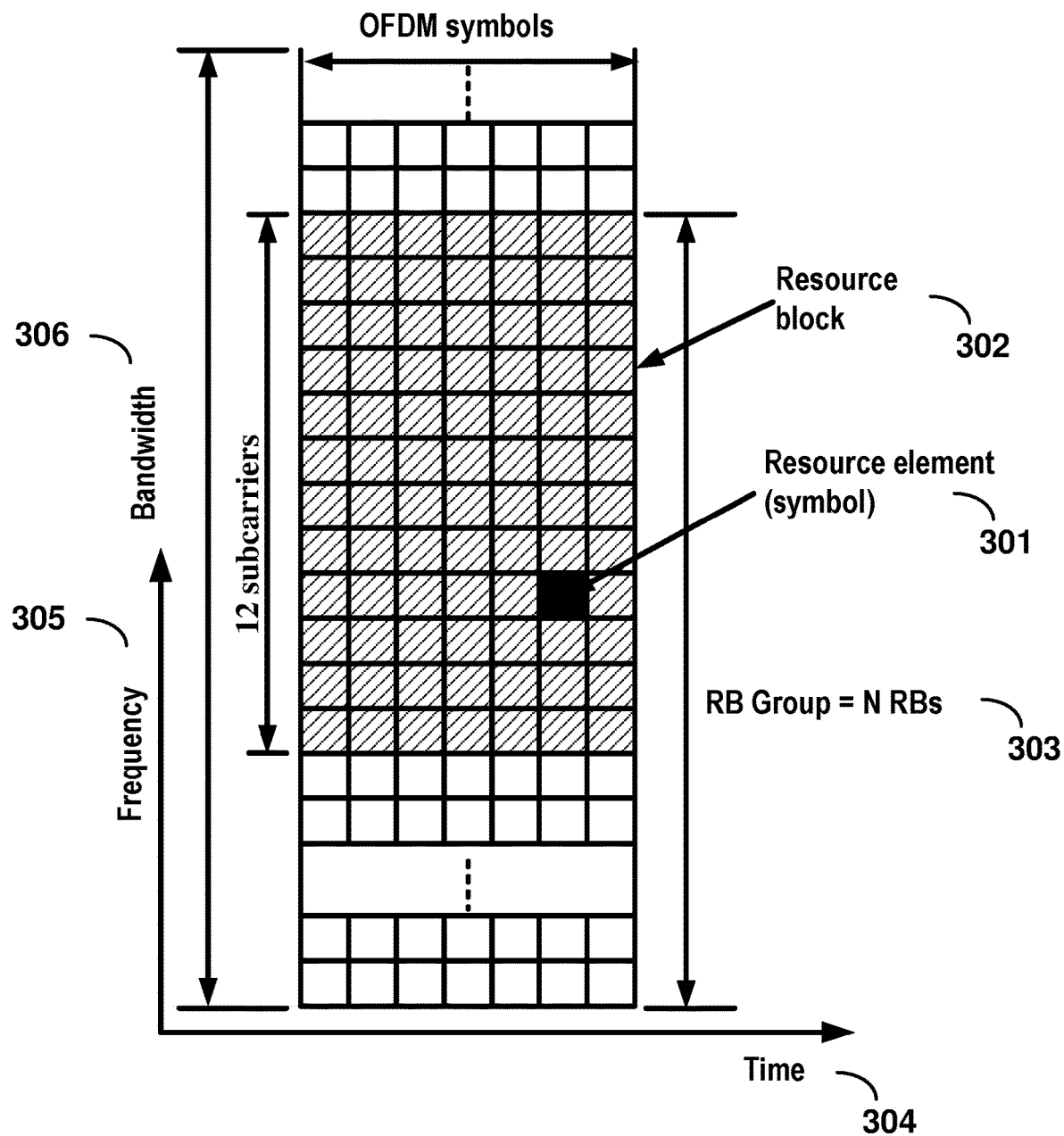
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
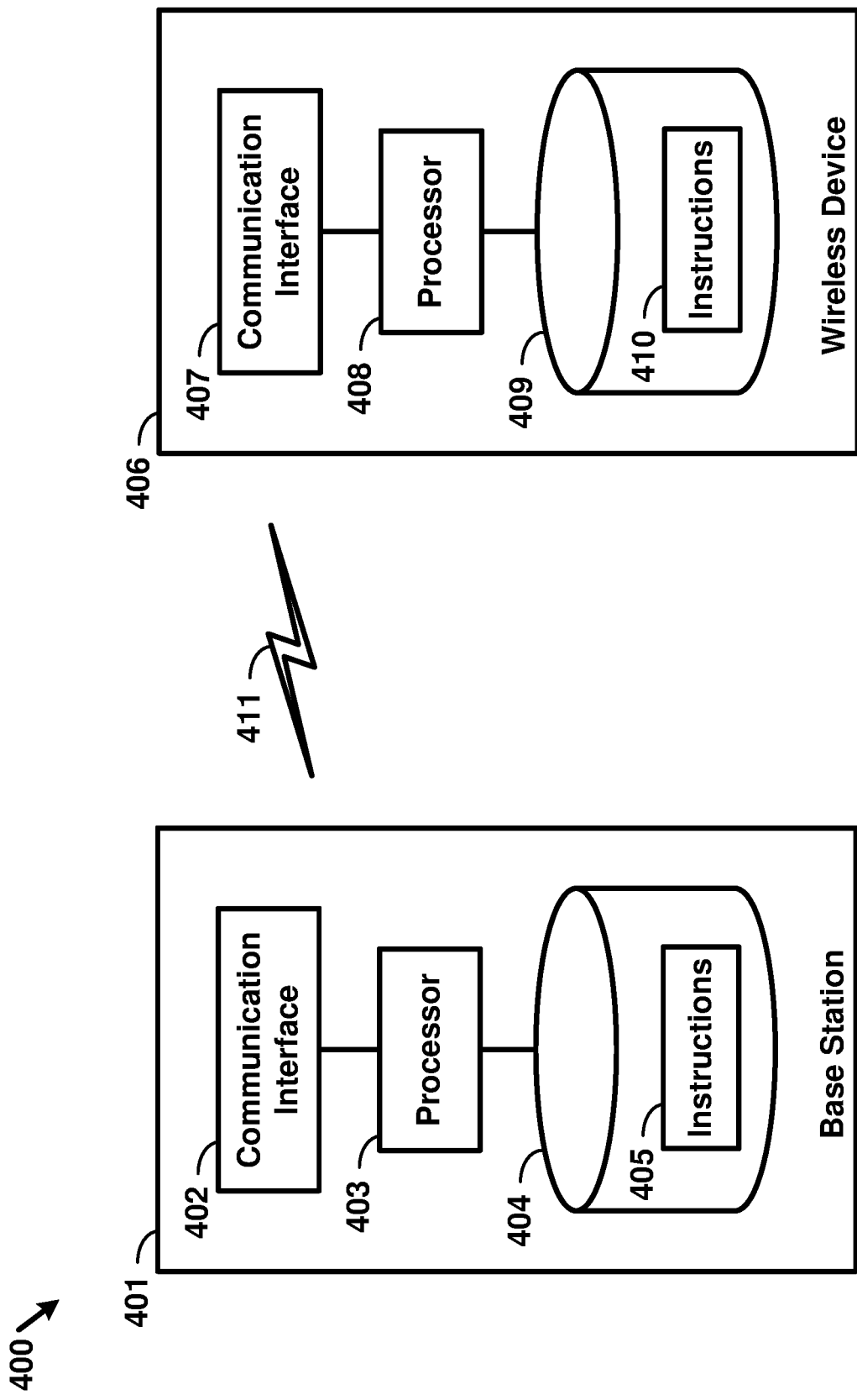
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
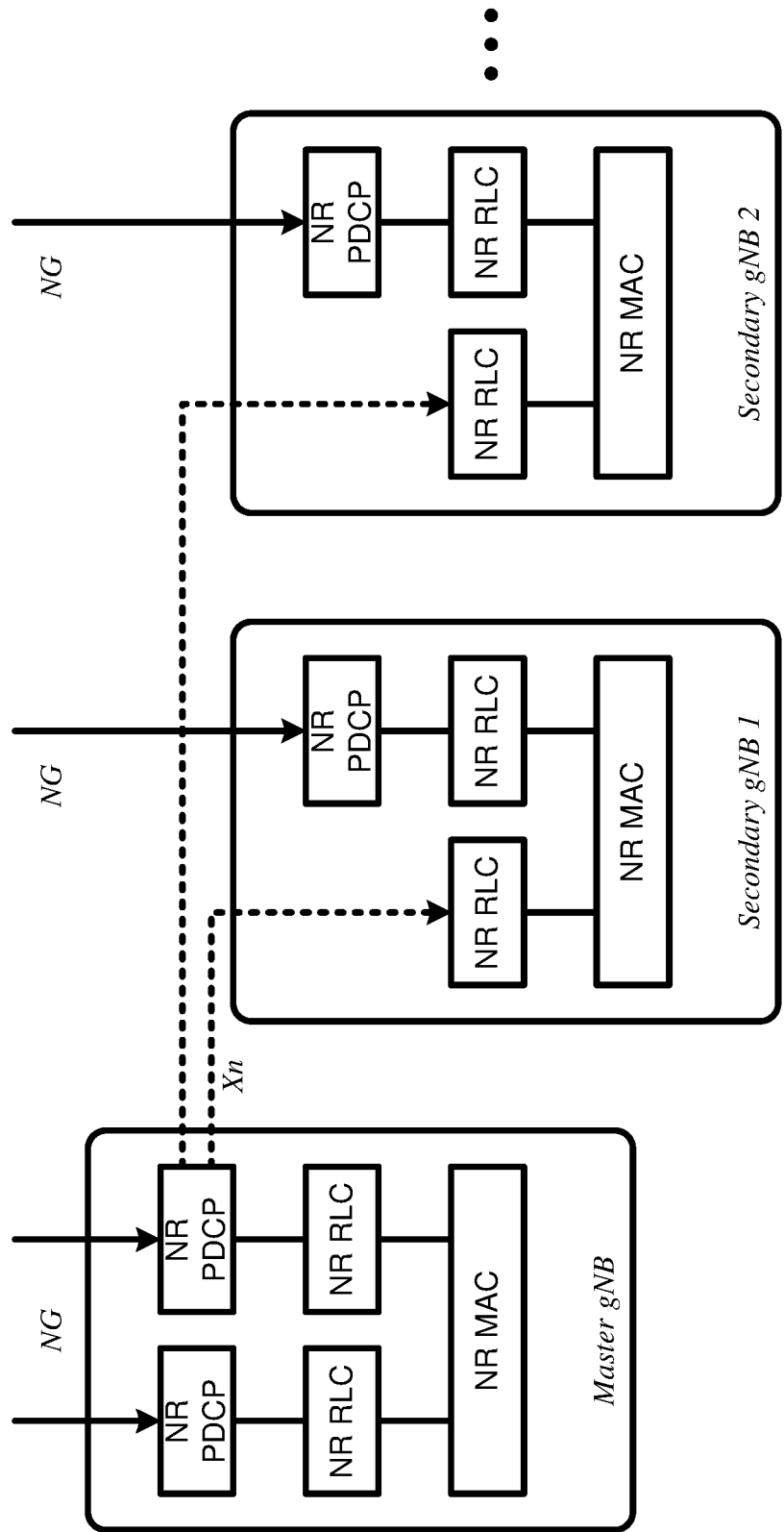
FIG. 6 is an example diagram for a protocol structure with multi-connectivity as per an aspect of an embodiment of the present invention.
Figure 7:
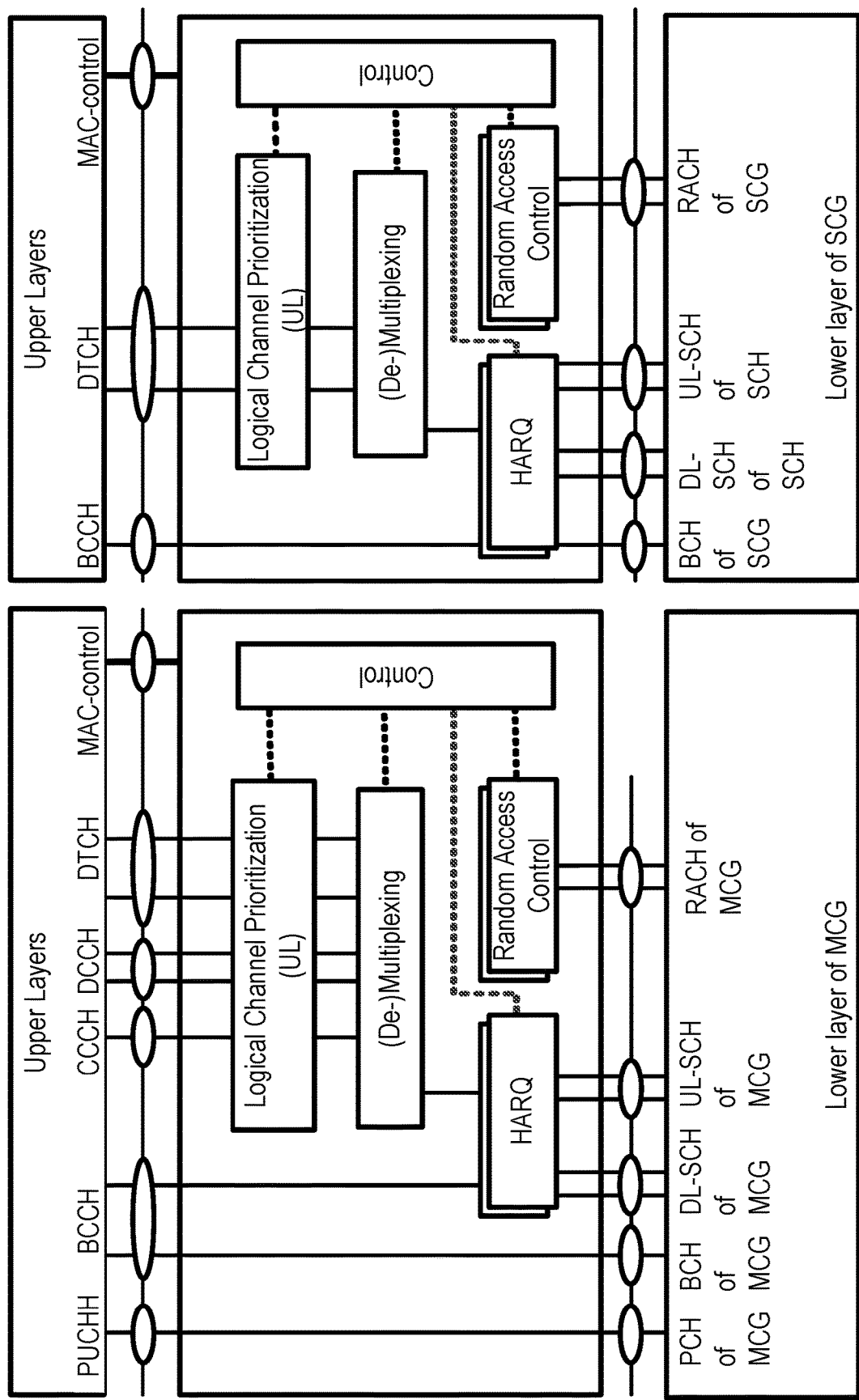
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
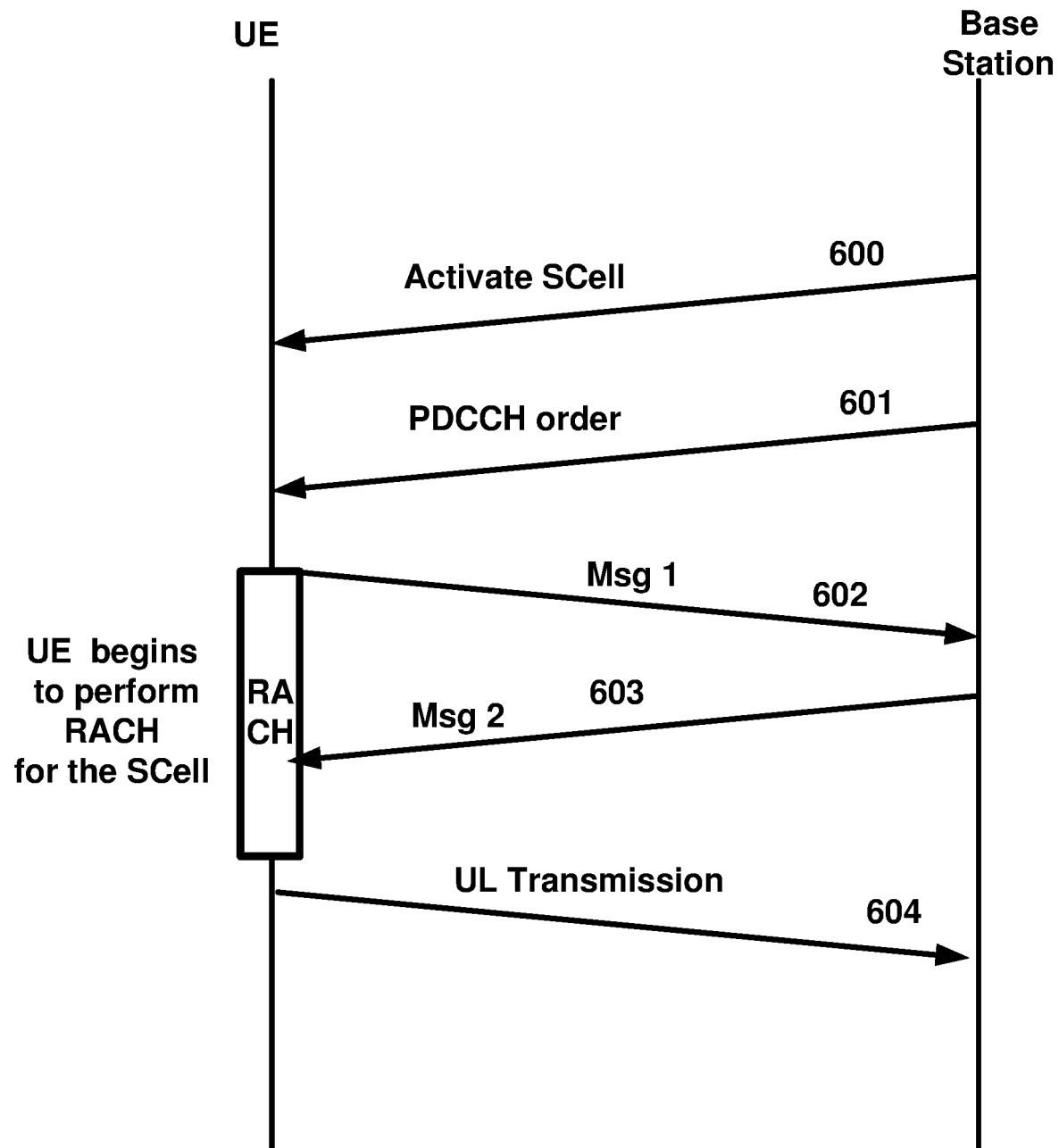
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
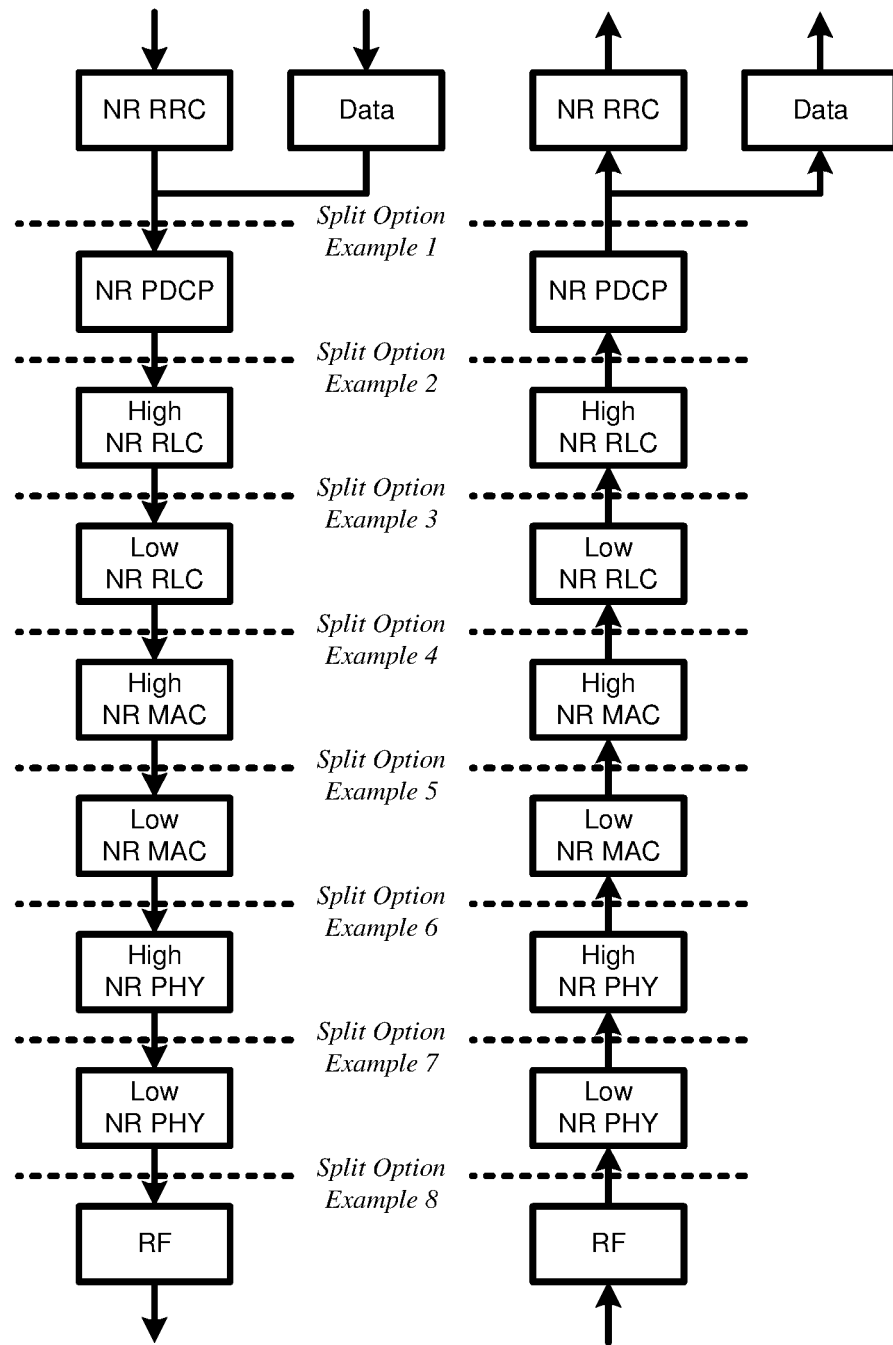
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one one or messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifier n, $0 \leq n \leq N$ (e.g., N=3, or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerology and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells. In an example, the priorities may indicate mapping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example, the MAC layer may provide data transfer services on logical channel. In an example, different logical channel types may be defined/configured for different kinds of data transfer services. In an example, a logical channel type may be defined by what type of information is transferred. In an example, the wireless device may perform a logical channel prioritization procedure (LCP) when a new transmission is performed. The LCP may determine the logical channels multiplexed in a transport block. A logical channel may be associated with buffers at the RLC layer and/or PDCP layer, etc.

In an example, an IE (e.g., LogicalChannelConfig) may be used to configure the logical channel parameters. An example, LogicalChannelConfig IE may be as follows:

```
LogicalChannelConfig ::=    SEQUENCE {
ul-SpecificParameters        SEQUENCE {
    priority                 INTEGER (1..16),
    prioritisedBitRate               ENUMERATED {kBps0, kBps8,
kBps16, kBps32, kBps64, kBps128,kBps256, infinity, kBps512-
v1020, kBps1024-v1020,kBps2048-v1020, spare5, spare4,
spare3, spare2,spare1},
    bucketSizeDuration               ENUMERATED {ms50, ms100,
ms150, ms300, ms500, ms1000, spare2,spare1},
    logicalChannelGroup                  INTEGER (0..3)
OPTIONAL           -- Need OR
}   OPTIONAL,
-- Cond UL
...,
[[ logicalChannelSR-Mask-r9              ENUMERATED {setup}
OPTIONAL        -- Cond SRmask
]],
[[ logicalChannelSR-Prohibit-r12         BOOLEAN
OPTIONAL        -- Need ON
]],
[[ laa-Allowed-r14        BOOLEAN             OPTIONAL,
-- Need ON
    bitRateQueryProhibitTimer-r14 ENUMERATED {s0, s0dot4,
s0dot8, s1dot6, s3, s6, s12,s30}         OPTIONAL   --Need
OR
]]
}
```

In an example, bitRateQueryProhibitTimer may be used for bit rate recommendation query in seconds. In an example, bucketSieDuration may be used for logical channel prioritization. In an example, laa-Allowed may indicate whether the data of a logical channel is allowed to be transmitted via UL of LAA SCells. Value TRUE may indicate that the logical channel is allowed to be sent via UL of LAA SCells. Value FALSE may indicate that the logical channel is not allowed to be sent via UL of LAA SCells. In an example, logicalChannelGroup may indicate mapping of logical channel to logical channel group for BSR reporting. In an example, logicalChannelSR-Mask may control SR triggering on a logical channel basis when an uplink grant is configured. In an example, value TRUE for logicalChannelSR-Prohibit may indicate that the logicalChannelSR-ProhibitTimer is enabled for the logical channel. In an example, logicalChannelSR-Prohibit may be configured if logicalChannelSR-Prohibit is configured. In an example, prioritisedBitRate may indicate Prioritized bit rate for logical channel prioritisation. In an example, priority may indicate priority for logical channel prioritization procedure.

In an example, for one-symbol short-PUCCH for UCI of up to 2 bits, the sequence length of 12 REs with consecutive mapping within a PRB may be used. In an example, the sequence length may be 24 or 48 Res. In an example, multiplexing may be used between sequence-based short-PUCCH and other sequences using CDM or FDM (e.g., DMRS for PUSCH/PUCCH, SRS, long-PUCCH). In an example, for the sequence length of 12 REs, the supported number of base sequences may be 30. The number of cyclic shifts available for one base sequence may be 12. In an example, for one-symbol short-PUCCH for UCI of more than 2 bits, the number of PRBs that may be used for a PUCCH may be configurable. In an example, contiguous and non-contiguous PRB allocation may be supported. In an example, contiguous PRB allocation may be prioritized. In an example, the number of DM-RS REs per PRB may be 4. In an example, DM-RS REs may be at the fixed positions within a PRB. The sequences used for DM-RS may be PN sequences as for PUSCH. In an example, for one-symbol short-PUCCH for UCI of more than 2 bits, DMRS REs may be evenly distributed within a PRB. In an example, for 2-symbol short-PUCCH for UCI of more than 2 bits, encoded UCI bits may be mapped across two symbols. In an example, one symbol short-PUCCH for UCI of more than 2 bits may be repeated across 2 symbols with or without frequency hopping. In an example, for a long-PUCCH for UCI of up to 2 bits, DMRS may occur in every other symbol in the long PUCCH (e.g., in even or odd symbols). In an example, for a long-PUCCH, frequency-hopping may be enabled/disabled by RRC signaling. In an example, frequency-hopping may be enabled for a long-PUCCH with larger than a certain duration. In an example, frequency-hopping for a PUCCH may occur within the active UL BWP for the UE. The active BWP may refer to BWP associated with the numerology of PUCCH. In an example, long-PUCCH for moderate UCI payload with multiplexing capacity may be supported. In an example, operation of a long PUCCH with more than 2 bits UCI may support multiplexing of multiple users on a single PRB. In an example, the format of long PUCCH supporting multiplexing of users on a single PRB, user multiplexing may be realized by time-domain OCC. In an example, user multiplexing is realized by pre-DFT-OCC. In an example, user multiplexing may be realized by FDM within the PRB. In an example, user multiplexing may be realized by pure TDM in the slot. In an example, for a PUCCH format for UCI with large payload with no multiplexing capacity within a slot, if frequency-hopping is enabled, for each frequency-hop with less than X symbols, there may be one DMRS symbol. In an example, X is not smaller than 4. In an example, for each frequency-hop with equal to or more than X symbols, there may be two DMRS symbols. In an example, for each frequency-hop, at least one DMRS symbol may be included. In an example, for the format of long PUCCH supporting multiplexing of users, user multiplexing may be realized by time-domain OCC. In an example, user multiplexing may be realized by pre-DFT-OCC. In an example, user multiplexing may be realized by FDM within the PRB. In an example, user multiplexing may be realized by pure TDM in the slot. In an example, to identify PUCCH resource, PUCCH format, starting symbol in a slot, which slot(s) the PUCCH is transmitted, PRB allocation Code/sequence index(es), frequency hopping pattern, duration of long PUCCH within a slot, etc. may be known by the wireless device.

In an example, for simultaneous transmission of 2-bit HARQ-ACK and SR, short PUCCH for UCI of up to 2 bits may be used. In an example, for short PUCCH with UCI of up to 2 bits (e.g., with/without SR) a sequence selection option may be used. In an example, the same set of sequences may be used in short PUCCH and long PUCCH when each is used for transmission of up to 2 UCI bits on one PRB. In an example, different set of sequences may be used in short PUCCH and long PUCCH when each is used for transmission of up to 2 UCI bits on one PRB. In an example, for one-symbol short-PUCCH for UCI of more than 2 bits, DMRS Res are evenly distributed within a PRB. In an example, for short-PUCCH for UCI of more than 2 bits, DMRS may be mapped on #1, #4, #7, #10 REs for a given RB. The RE indexing may start from 0. In an example, PN sequences as for PUSCH may be used for DMRS sequence of short-PUCCH for UCI of more than 2 bits. In an example, for two-symbol PUCCH with more than two UCI bits, the DM-RS density and pattern (e.g., the DM-RS locations) of one-symbol PUCCH with UCI more than two bits may be used for each symbol of the 2-symbol PUCCH. In an example, for two-symbol dhort PUCCH with up to two UCI bits, sequence hopping between the two symbol may be supported. In an example, for one or two-symbol short PUCCH for UCI of more than two bits, the encoded bits may be scrambled. In an example, for long PUCCH for UCI of up to two bits, DMRS may be located in even symbols, where the symbol may be indexed from the start of the long PUCCH of value 0. In an example, for long PUCCH for UCI up to 2 bits, up to 3 OCC multiplexing capacity may be supported with frequency hopping. In an example, for long PUCCH moderate payload size without multiplexing capability, an additional DMRS symbol in each frequency-hop may be configured. In an example, for long PUCCH moderate payload size without multiplexing capability, fixed number of DMRS symbol in each frequency-hop (e.g., 1 DMRS symbol) may be used. In an example, for each frequency-hop with less than X symbols, there may be one DMRS symbol in each frequency-hop. In an example, for each frequency-hop with equal to or more than X symbols, there may be two DMRS symbols in each frequency-hop. In an example, additional DMRS using pre-DFT multiplexing of DMRS and data may be used. In an example, two DMRS symbol per frequency-hop may be used when the payload size is less than Y and each frequency-hop with less than or equal to X=6 number of symbols. Otherwise, one DMRS symbol per frequency-hop may be used. In an example, for long PUCCH over multiple slots, the duration(s) of long PUCCH in each slot may be the same or may be different. In an example, for slot-based scheduling, HARQ feedback with more than 2 bits, PUSCH may be rate-matched. In an example, for slot-based scheduling, for HARQ feedback with up to two bits, PUSCH may be punctured. In an example, for UCI on PUSCH, $\beta_{offset}$ may be dynamically or semi-statically configured. In an example, a set of PUCCH resources at least for HARQ feedback may be configured to a wireless device by higher layer signaling. In an example, one or multiple set(s) of PUCCH resources consisting of same or different PUCCH formats may be configured. In an example, one or multiple set(s) of PUCCH resources for each PUCCH format may be configured. In an example, a set of PUCCH resources for each duration of each PUCCH format may be configured. In an example, a set of PUCCH resources for PUCCH formats carrying up to 2 bits UCI may be configured. In an example, another set of PUCCH resources for PUCCH formats carrying more 2 bits UCI may be configured.

In an example, for open-loop power control parameters for a PUSCH, gNB may configure one or more multiple P0 values. For example, for specific combination(s) of one or more beam(s), waveform and/or service type may be configured. In an example, gNB may configure one or multiple alpha values. In an example, path loss calculation may be based on periodic CSI-RS if configured. In an example, path loss calculation may be based on periodic CSI-RS for example for power calculation of PUSCH and/or SRS and/or PUCCH. In an example, both SSS and DM-RS for PBCH of SS block may be used for PL calculation of UL power control if the power offset between SSS and DM-RS for PBCH is known by the wireless device. In an example, if the power offset between SSS and DM-RS for PBCH is not known by the wireless device, SSS of SS block may be used for path loss computation for uplink power control. In an example, CSI-RS may be used for path loss computation of uplink power control. In an example, two or more downlink reference signals may be used and the path loss measurements may be combined.

Example power control mechanism is described here. Some detailed parameters are provided in examples. The basic processes may be implemented in technologies such as LTE, New Radio, and/or other technologies. A radio technology may have its own specific parameters. Example embodiments describe a method for implementing power control mechanism. Other example embodiments of the invention using different parameters may be implemented. Some example embodiments enhance physical layer power control mechanisms when a plurality of PUCCHs are transmitted in parallel.

In an example embodiment, downlink power control may determine the Energy Per Resource Element (EPRE). The term resource element energy may denote the energy prior to CP insertion. The term resource element energy may denote the average energy taken over all constellation points for the modulation scheme applied. Uplink power control determines the average power over a SC-FDMA symbol in which the physical channel may be transmitted.

In an example, plink power control may control the transmit power of the different uplink physical channels.

In an example, if a UE is configured with a LAA SCell for uplink transmissions, the UE may apply the procedures described for PUSCH and SRS in this clause assuming frame structure type 1 for the LAA SCell unless stated otherwise.

In an example, for PUSCH, the transmit power $\hat{P}_{PUSCH,c}(i)$, may be first scaled by the ratio of the number of antennas ports with a non-zero PUSCH transmission to the number of configured antenna ports for the transmission scheme. The resulting scaled power may be then split equally across the antenna ports on which the non-zero PUSCH is transmitted. For PUCCH or SRS, the transmit power $\hat{P}_{PUCCH}(i)$, or $\hat{P}_{SRS,c}(i)$ may be split equally across the configured antenna ports for PUCCH or SRS. In an example, $\hat{P}_{SRS,c}(i)$ may be the linear value of $P_{SRS,c}(i)$. A cell wide overload indicator (OI) and a High Interference Indicator (HII) to control UL interference may be parameters in LTE or 5G technology.

In an example, if the UE is configured with a SCG, the UE may apply the procedures described in this clause for both MCG and SCG. In an example, when the procedures are applied for MCG, the terms 'secondary cell', 'secondary cells', 'serving cell', 'serving cells' in this clause refer to secondary cell, secondary cells, serving cell, serving cells belonging to the MCG respectively. In an example, when the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

In an example, if the UE is configured with a PUCCH-SCell, the UE may apply the procedures described in this clause for both primary PUCCH group and secondary PUCCH group. In an example, when the procedures are applied for primary PUCCH group, the terms 'secondary cell', 'secondary cells', 'serving cell', 'serving cells' in this clause refer to secondary cell, secondary cells, serving cell, serving cells belonging to the primary PUCCH group respectively. In an example, when the procedures are applied for secondary PUCCH group, the terms 'secondary cell', 'secondary cells', 'serving cell', 'serving cells' in this clause refer to secondary cell, secondary cells, serving cell, serving cells belonging to the secondary PUCCH group respectively.

In an example, if the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min \begin{Bmatrix} P_{CMAX,c}(i), \\ 10\log_{10}(M_{PUSHC,c}(i)) + P_{O\_PUSCH,c}(j) + \alpha_c(j) \cdot PL_c + \Delta_{TF,c}(i) + f_c(i) \end{Bmatrix}$$

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

In an example, if the UE transmits PUSCH simultaneous with PUCCH for the serving cell c, then the UE transmit power $P_{PUSCH,c}(i)$ for the PUSCH transmission in subframe i for the serving cell c may be given by $$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSHC,c}(i)) + P_{O\_PUSCH,c}(j) + \alpha_c(j) \cdot PL_c + \Delta_{TF,c}(i) + f_c(i) \end{Bmatrix}$$

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

In an example, if the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $P_{PUSCH,c}(i) = \min\{P_{CMAX,c}(i), P_{O\_PUSCH,c}(1) + \alpha_c(1) \cdot PL_c + f_c(i)\} P_{PUSCH,c}(i) = \min\{P_{CMAX,c}(i), P_{O\_PUSCH,c}(1) + \alpha_c(1) \cdot PL_c + f_c(i)\}$ [dBm]

In an example, $P_{CMAX,c}(i)$ is the configured UE transmit power in subframe i for serving cell c and $\hat{P}_{CMAX,c}(i)$ is the linear value of $P_{CMAX,c}(i)$. In an example, if the UE transmits PUCCH without PUSCH in subframe i for the serving cell c, the accumulation of TPC command received with DCI format 3/3A for PUSCH may be considered. In an example, if the UE does not transmit PUCCH and PUSCH in subframe i for the serving cell c, for the accumulation of TPC command received with DCI format 3/3A for PUSCH, the UE shall compute $P_{CMAX,c}$ (i) assuming MPR=0 dB, A-MPR=0 dB, P-MPR=0 dB and □TC=0 dB. In an example, $\hat{P}_{PUCCH}(i)$ may be the linear value of $P_{PUCCH}(i)$. In an example, $M_{PUSCH,c}(i)$ is the bandwidth of the PUSCH resource assignment expressed in number of resource blocks valid for subframe i and serving cell c. In an example, the UE may be configured with higher layer parameter Uplink-PowerControlDedicated-v12x0 for serving cell c. In an example, subframe i may belong to uplink power control subframe set 2 as indicated by the higher layer parameter tpc-SubframeSet-r12.

In an example, when j=0, $$P_{O\_PUSCH,c}(0) = P_{O\_UE\_PUSCH,c,2}(0) + P_{O\_NOMINAL\_PUSCH,c,2}(0) P_{O\_PUSCH,c}(0) = P_{O\_UE\_PUSCH,c,2}(0) + P_{O\_NOMINAL\_PUSCH,c,2}(0),$$

where j=0 is used for PUSCH (re)transmissions corresponding to a semi-persistent grant, $P_{O\_UE\_PUSCH,c,2}(0)$ and $P_{O\_NOMINAL\_PUSCH,c,2}(0)$ are the parameters p0-UE-PUSCH-Persistent-SubframeSet2-r12 and p0-Nominal-PUSCH-Persistent-SubframeSet2-r12 respectively provided by higher layers, for each serving cell c.

In an example, when j=1, $$P_{O\_PUSCH,c}(1) = P_{O\_UE\_PUSCH,c,2}(1) + P_{O\_NOMINAL\_PUSCH,c,2}(1) P_{O\_PUSCH,c}(1) = P_{O\_UE\_PUSCH,c,2}(1) + P_{O\_NOMINAL\_PUSCH,c,2}(1),$$

where j=1 is used for PUSCH (re)transmissions corresponding to a dynamic scheduled grant. $P_{O\_UE\_PUSCH,c,2}(1)$ and $P_{O\_NOMINAL\_PUSCH,c,2}(1)$ are the parameters p0-UE-PUSCH-SubframeSet2-r12 and p0-NominalPUSCH-SubframeSet2-r12 respectively, provided by higher layers for serving cell c.

In an example, when j=2, $$P_{O\_PUSCH,c}(2) = P_{O\_UE\_PUSCH,c}(2) + P_{O\_NOMINAL\_PUSCH,c}(2) P_{O\_PUSCH,c}(2)$$
$$= P_{O\_UE\_PUSCH,c}(2) + P_{O\_NOMINAL\_PUSCH,c}(2)$$

where $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ are signalled from higher layers for serving cell c, where j=2 is used for PUSCH (re)transmissions corresponding to the random access response grant.

In an example, $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ are signalled from higher layers for serving cell c.

In an example, if the UE is configured with higher layer parameter UplinkPowerControlDedicated-v12x0 for serving cell c and if subframe i belongs to uplink power control subframe set 2 as indicated by the higher layer parameter tpc-SubframeSet-r12, For j=0 or 1, $\alpha_c(j) = \alpha_{c,2} \in \{0, 0.4, 0.5, 0.6, 0.7, 0.8, 0.9, 1\}$. $\alpha_{c,2}$ may be the parameter alpha-SubframeSet2-r12 provided by higher layers for each serving cell c. For j=2, $\alpha_c(j) = 1$. Otherwise, for j=0 or 1, $\alpha_c \in \{0, 0.4, 0.5, 0.6, 0.7, 0.8, 0.9, 1\}$ may be a 3-bit parameter provided by higher layers for serving cell c. In an example, for j=2, $\alpha_c(j) = 1$.

In an example, $PL_c$ may be the downlink path loss estimate calculated in the UE for serving cell c in dB and $PL_c$ = referenceSignalPower – higher layer filtered RSRP, where referenceSignalPower may be provided by higher layers and RSRP may be defined for the reference serving cell and the higher layer filter configuration may be defined for the reference serving cell.

In an example, if serving cell c belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP.

In an example, if serving cell c belongs to a TAG containing the PSCell then, for the uplink of the PSCell, the PSCell may be used as the reference serving cell for determining referenceSignalPower and higher layer filtered RSRP; for the uplink of the secondary cell other than PSCell, the serving cell configured by the higher layer parameter pathlossReferenceLinking may be used as the reference serving cell for determining referenceSignalPower and higher layer filtered RSRP.

In an example, if serving cell c belongs to a TAG not containing the primary cell or PSCell then serving cell c is used as the reference serving cell for determining referenceSignalPower and higher layer filtered RSRP.

In an example, $\Delta_{TF,c}(i) = 10 \log_{10}((2^{BPRE \cdot K_S} - 1) \cdot \beta_{offset}^{PUSCH})$ for $K_S = 1.25$ and 0 for $K_S = 0$ where $K_S$ may be given by the parameter deltaMCS-Enabled provided by higher layers for each serving cell c. In an example, BPRE and $\beta_{offset}^{PUSCH}$, for each serving cell c, may be computed as below. In an example, $K_S = 0$ for transmission mode 2.

In an example, BPRE = $O_{CQI}/N_{RE}$ for control data sent via PUSCH without UL-SCH data and $\sum_{r=0}^{C-1} K_r/N_{RE}$ for other cases. In an example, C may be the number of code blocks, $K_r$ may be the size for code block r, $O_{CQI}$ may be the number of CQI/PMI bits including CRC bits and $N_{RE}$ may be the number of resource elements determined as $N_{RE} = M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ are parameters in LTE technology. In an example, $\beta_{offset}^{PUSCH} = \beta_{offset}^{CQI}$ for control data sent via PUSCH without UL-SCH data and one for other cases.

In an example, $\delta_{PUSCH,c}$ may be a correction value, also referred to as a TPC command and may be included in PDCCH/EPDCCH with DCI format 0/0A/0B/4/4A/4B or in MPDCCH with DCI format 6-0A for serving cell c or jointly coded with other TPC commands in PDCCH/MPDCCH with DCI format 3/3A whose CRC parity bits are scrambled with TPC-PUSCH-RNTI. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c may be given by $f_{c,2}(i)$, and the UE may use $f_{c,2}(i)$ instead of $f_c(i)$ to determine $P_{PUSCH,c}(i)$. Otherwise, the current PUSCH power control adjustment state for serving cell c may be given by $f_c(i)$. $f_{c,2}(i)$ and $f_c(i)$ may be defined by: $f_c(i) = f_c(i-1) + \delta_{PUSCH,c}(i-K_{PUSCH})$ and $f_{c,2}(i) = f_{c,2}(i-1) + \delta_{PUSCH,c}(i-K_{PUSCH})$ if accumulation is enabled based on the parameter Accumulation-enabled provided by higher layers or if the TPC command $\delta_{PUSCH,c}$ is included in a PDCCH/EPDCCH with DCI format 0 or in a MPDCCH with DCI format 6-0A for serving cell c where the CRC is scrambled by the Temporary C-RNTI. In an example, $\delta_{PUSCH,c}(i-K_{PUSCH})$ was signalled on PDCCH/EPDCCH with DCI format 0/0A/0B/4/4A/4B or MPDCCH with DCI format 6-0A or PDCCH/MPDCCH with DCI format 3/3A on subframe $i-K_{PUSCH}$, and where $f_c(0)$ is the first value after reset of accumulation. For a BL/CE UE configured with CEModeA, subframe $i-K_{PUSCH}$ may be the last subframe in which the MPDCCH with DCI format 6-0A or MPDCCH with DCI format 3/3A is transmitted.

In an example, for FDD or FDD-TDD and serving cell frame structure type 1, $K_{PUSCH}=4$. In an example, for TDD, if the UE is configured with more than one serving cell and the TDD UL/DL configuration of at least two configured serving cells is not the same, or if the UE is configured with the parameter EIMTA-MainConfigServCell-r12 for at least one serving cell, or for FDD-TDD and serving cell frame structure type 2, the "TDD UL/DL configuration" may refer to the UL-reference UL/DL configuration for serving cell c. In an example, for TDD UL/DL configurations 1-6 and UE not configured with higher layer parameter symPUSCH-UpPts-r14 for the serving cell c, $K_{PUSCH}$ may be specified. In an example, for TDD UL/DL configuration 0 and UE not configured with higher layer parameter symPUSCH-UpPts-r14 for the serving cell c. In an example, if the PUSCH transmission in subframe 2 or 7 is scheduled with a PDCCH/EPDCCH of DCI format 0/4 or a MPDCCH with DCI format 6-0A in which the LSB of the UL index is set to 1, $K_{PUSCH}=7$. In an example, For all other PUSCH transmissions, $K_{PUSCH}$ may be specified. In an example, for TDD UL/DL configurations 0-5 and UE configured with higher layer parameter symPUSCH-UpPts-r14 for the serving cell c, $K_{PUSCH}$ may be specified. In an example, for TDD UL/DL configuration 6 and UE configured with higher layer parameter symPUSCH-UpPts-r14 for the serving cell c, if the PUSCH transmission in subframe 2 or 7 is scheduled with a PDCCH/EPDCCH of DCI format 0/4 in which the LSB of the UL index is set to 1, $K_{PUSCH}=6$ and for all other PUSCH transmissions, $K_{PUSCH}$ may be specified.

In an example, the $\delta_{PUSCH,c}$ dB absolute values signalled on PDCCH/EPDCCH with DCI format 0/0A/0B/4/4A/4B or a MPDCCH with DCI format 6-0A may be given in Table 2. If the PDCCH/EPDCCH with DCI format 0 or a MPDCCH with DCI format 6-0A is validated as a SPS activation or release PDCCH/EPDCCH/MPDCCH, then $\delta_{PUSCH,c}$ may be 0 dB.

In an example, for a non-BL/CE UE, $f_c(i)=f_c(i-1)$ and $f_{c,2}(i)=f_{c,2}(i-1)$ for a subframe where no PDCCH/EPDCCH with DCI format 0/0A/0B/4/4A/4B is decoded for serving cell c or where DRX occurs or i is not an uplink subframe in TDD or FDD-TDD and serving cell c frame structure type 2.

In an example, for a BL/CE UE configured with CEModeA, $f_c(i)=f_c(i-1)$ and $f_{c,2}(i)=f_{c,2}(i-1)$ for a subframe where no MPDCCH with DCI format 6-0A is decoded for serving cell c or where DRX occurs or i is not an uplink subframe in TDD.

In an example, if the UE is configured with higher layer parameter UplinkPowerControlDedicated-v12x0 for serving cell c and if subframe i belongs to uplink power control subframe set 2 as indicated by the higher layer parameter tpc-SubframeSet-r12. If subframe i does not belong to uplink power control subframe set 2 as indicated by the higher layer parameter tpc-SubframeSet-r12 $f_{c,2}(i)=f_{c,2}(i-1)$.

In an example, for both types of $f_c(*)$ (accumulation or current absolute) the first value is set as follows: If $P_{O\_UE\_PUSCH,c}$ value is changed by higher layers and serving cell c is the primary cell or, if $P_{O\_UE\_PUSCH,c}$ value is received by higher layers and serving cell c is a Secondary cell, $f_c(0)=0$. Otherwise, If the UE receives the random access response message for a serving cell c, $f_c(0) = \Delta P_{rampup,c} + \delta_{msg2,c}$, where $\delta_{msg2,c}$ is the TPC command indicated in the random access response corresponding to the random access preamble transmitted in the serving cell c, and $$\Delta P_{rampup,c} = \min\left\{\max\left(0, P_{CMAX,c} - \begin{pmatrix} 10\log_{10}(M_{PUSCH,c}(0)) + \\ P_{O\_PUSCH,c}(2) + \delta_{msg2} + \\ \alpha_c(2) \cdot PL + \Delta_{TF,c}(0) \end{pmatrix}\right)\right\},$$

$$\Delta P_{rampup,c} = \min\left[\left\{\max\left(0, P_{CMAX,c} - \begin{pmatrix} 10\log_{10}(M_{PUSCH,c}(0)) + \\ P_{O\_PUSCH,c}(2) + \delta_{msg2} + \\ \alpha_c(2) \cdot PL + \Delta_{TF,c}(0) \end{pmatrix}\right)\right\}\right.$$
$$\left. \Delta P_{rampuprequested,c} \right]$$

and $\Delta P_{rampuprequested,c}$ is provided by higher layers and corresponds to the total power ramp-up requested by higher layers from the first to the last preamble in the serving cell c, $M_{PUSCH,c}(0)$ is the bandwidth of the PUSCH resource assignment expressed in number of resource blocks valid for the subframe of first PUSCH transmission in the serving cell c, and $\Delta_{TF,c}(0)$ is the power adjustment of first PUSCH transmission in the serving cell c. In an example, If $P_{O\_UE\_PUSCH,c,2}$ value is received by higher layers for a serving cell c, $f_{c,2}(0)=0$.

In an example, if the UE is not configured with an SCG or a PUCCH-SCell, and if the total transmit power of the UE would exceed $\hat{P}_{CMAX}(i)$, the UE may scale $\hat{P}_{PUSCH,c}(i)$ for the serving cell c in subframe i such that the condition $$\sum_c w(i) \cdot \hat{P}_{PUSCH,c}(i) \leq \left(\hat{P}_{CMAX}(i) - \hat{P}_{PUCCH}(i)\right)$$

is satisfied where $\hat{P}_{PUCCH}(i)$ may be the linear value of $P_{PUCCH}(i)$, $\hat{P}_{PUSCH,c}(i)$ may be the linear value of $P_{PUSCH,c}(i)$, $\hat{P}_{CMAX}(i)$ may be the linear value of the UE total configured maximum output power $P_{CMAX}$ in subframe i and $w(i)$ may be a scaling factor of $P_{PUSCH,c}(i)$ for serving cell c where $0 \leq w(i) \leq 1$. In case there is no PUCCH transmission in subframe i, $\hat{P}_{PUCCH}(i)=0$.

In an example, if the UE is not configured with an SCG or a PUCCH-SCell, and if the UE has PUSCH transmission with UCI on serving cell j and PUSCH without UCI in any of the remaining serving cells, and the total transmit power of the UE would exceed $\hat{P}_{CMAX}(i)$, the UE may scale $\hat{P}_{PUSCH,c}(i)$ for the serving cells without UCI in subframe i such that the condition $$\sum_{c \neq j} w(i) \cdot \hat{P}_{PUSCH,c}(i) \leq \left(\hat{P}_{CMAX}(i) - \hat{P}_{PUSCH,j}(i)\right)$$

is satisfied where $\hat{P}_{PUSCH,j}(i)$ is the PUSCH transmit power for the cell with UCI and $w(i)$ is a scaling factor of $\hat{P}_{PUSCH,c}(i)$ for serving cell c without UCI. In this case, no power scaling may be applied to $\hat{P}_{PUSCH,j}(i)$ unless $\sum_{c \neq j} w(i) \cdot \hat{P}_{PUSCH,c}(i)=0$ and the total transmit power of the UE still would exceed $\hat{P}_{CMAX}(i)$.

In an example, for a UE not configured with a SCG or a PUCCH-SCell, $w(i)w(i)$ values may be the same across serving cells when $w(i)>0$ $w(i)>0$ but for certain serving cells $w(i)w(i)$ may be zero.

In an example, if the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE may obtain $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i)))\hat{P}_{PUSCH,j}(i)$$
$$= \min(\hat{P}_{PUSCH,j}(i), (\hat{P}_{CMAX}(i) - \hat{P}_{PUCCH}(i)))$$

and $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

In an example, if the UE is not configured with a SCG or a PUCCH-SCell, and If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG the UE may adjust its total transmission power to not exceed $P_{CMAX}$ on any overlapped portion.

In an example, if the UE is not configured with a SCG or a PUCCH-SCell and if the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG the UE may adjust its total transmission power to not exceed $P_{CMAX}$ on any overlapped portion.

In an example, if the UE is not configured with a SCG or a PUCCH-SCell and if the UE is configured with multiple TAGs, and if the SRS transmission of the UE in a symbol on subframe i for a given serving cell in a TAG overlaps with the PUCCH/PUSCH transmission on subframe for subframe i+1 for a different serving cell in the same or another TAG the UE may drop SRS if its total transmission power exceeds $P_{CMAX}$ on any overlapped portion of the symbol.

In an example, if the UE is not configured with a SCG or a PUCCH-SCell and if the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s) the UE may drop the SRS transmissions if the total transmission power exceeds $P_{CMAX}$ on any overlapped portion of the symbol.

In an example, if the UE is not configured with a SCG or a PUCCH-SCell and if the UE is configured with multiple TAGs, the UE may, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.

In an example, if the UE is not configured with a SCG or a PUCCH-SCell and if the UE is configured with multiple TAGs, the UE may, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

In an example, if the UE is configured with a LAA SCell for uplink transmissions, the UE may compute the scaling factor w(i) assuming that the UE performs a PUSCH transmission on the LAA SCell in subframe i irrespective of whether the UE can access the LAA SCell for the PUSCH transmission in subframe i according to the channel access procedures.

In an example, for a BL/CE UE configured with CEModeA, if the PUSCH is transmitted in more than one subframe i0, i1, . . . , iN-1 where i0<i1< . . . <iN-1, the PUSCH transmit power in subframe ik, k=0, 1, . . . , N-1, may be determined by $P_{PUSCH,c}(i_k) = P_{PUSCH,c}(i_0)$. For a BL/CE UE configured with CEModeB, the PUSCH transmit power in subframe ik may be determined by $P_{PUSCH,c}(i_k) = P_{CMAX,c}(i_0)$.

In an example, if serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell C may be defined by $$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm]$$

In an example, if the UE is not transmitting PUCCH for the primary cell, for the accumulation of TPC command for PUCCH, the UE may assume that the UE transmit power $P_{PUCCH}$ for PUCCH in subframe i may be computed by $$P_{PUCCH}(i) = \min\{P_{CMAX,c}(i), P_{0\_PUCCH} + PL_c + g(i)\} \text{ [dBm]}$$

In an example, $P_{CMAX,c}(i)$ may be the configured UE transmit power in subframe i for serving cell c. If the UE transmits PUSCH without PUCCH in subframe i for the serving cell c, for the accumulation of TPC command for PUCCH, the UE may assume $P_{CMAX,c}(i)$ as given by LTE procedures. If the UE does not transmit PUCCH and PUSCH in subframe i for the serving cell c, for the accumulation of TPC command for PUCCH, the UE may compute $P_{CMAX,c}(i)$ assuming MPR=0 dB, A-MPR=0 dB, P-MPR=0 dB and OTC=0 dB, where MPR, A-MPR, P-MPR and TC are LTE parameters.

In an example, the parameter $\Delta_{F\_PUCCH}(F)$ may be provided by higher layers. Each $\Delta_{F\_PUCCH}(F)$ value may correspond to a PUCCH format (F) relative to PUCCH format 1a, where each PUCCH format (F).

In an example, if the UE is configured by higher layers to transmit PUCCH on two antenna ports, the value of $\Delta_{TxD}(F')$ may be provided by higher layers where each PUCCH format F' is defined according to LTE procedures. otherwise, $\Delta_{TxD}(F')=0$.

In an example, $h(n_{CQI}, n_{HARQ}, n_{SR})$ may be a PUCCH format dependent value, where $n_{CQI}$ may correspond to the number of information bits for the channel quality information. $n_{SR}=1$ if subframe i is configured for SR for the UE not having any associated transport block for UL-SCH, otherwise $n_{SR}=0$. If the UE is configured with more than one serving cell, or the UE is configured with one serving cell and transmitting using PUCCH format 3, the value of $n_{HARQ}$ is defined according to LTE procedures; otherwise, $n_{HARQ}$ may be the number of HARQ-ACK bits sent in subframe i. In an example, for PUCCH format 1, 1a and 1b $h(n_{CQI}, n_{HARQ}, n_{SR})=0$. In an example, for PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})=0$. In an example, for PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

In an example, for PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

In an example, for PUCCH format 3 and when UE transmits HARQ-ACK/SR without periodic CSI, if the UE is configured by higher layers to transmit PUCCH format 3 on two antenna ports, or if the UE transmits more than 11 bits of HARQ-ACK/SR $$h(n_{CQI}, n_{HARQ}, n_{SR}) = \frac{n_{HARQ} + n_{SR} - 1}{3}$$

otherwise, $$h(n_{CQI}, n_{HARQ}, n_{SR}) = \frac{n_{HARQ} + n_{SR} - 1}{2}$$

In an example, for PUCCH format 3 and when UE transmits HARQ-ACK/SR and periodic CSI, if the UE is configured by higher layers to transmit PUCCH format 3 on two antenna ports, or if the UE transmits more than 11 bits of HARQ-ACK/SR and CSI $$h(n_{CQI}, n_{HARQ}, n_{SR}) = \frac{n_{HARQ} + n_{SR} + n_{CQI} - 1}{3}$$

otherwise, $$h(n_{CQI}, n_{HARQ}, n_{SR}) = \frac{n_{HARQ} + n_{SR} + n_{CQI} - 1}{2}$$

In an example, for PUCCH format 4, $M_{PUCCH,c}(i)$ is the bandwidth of the PUCCH format 4 expressed in number of resource blocks valid for subframe i and serving cell c. For PUCCH format 5, $M_{PUCCH,c}(i)=1$.

Figure 15:
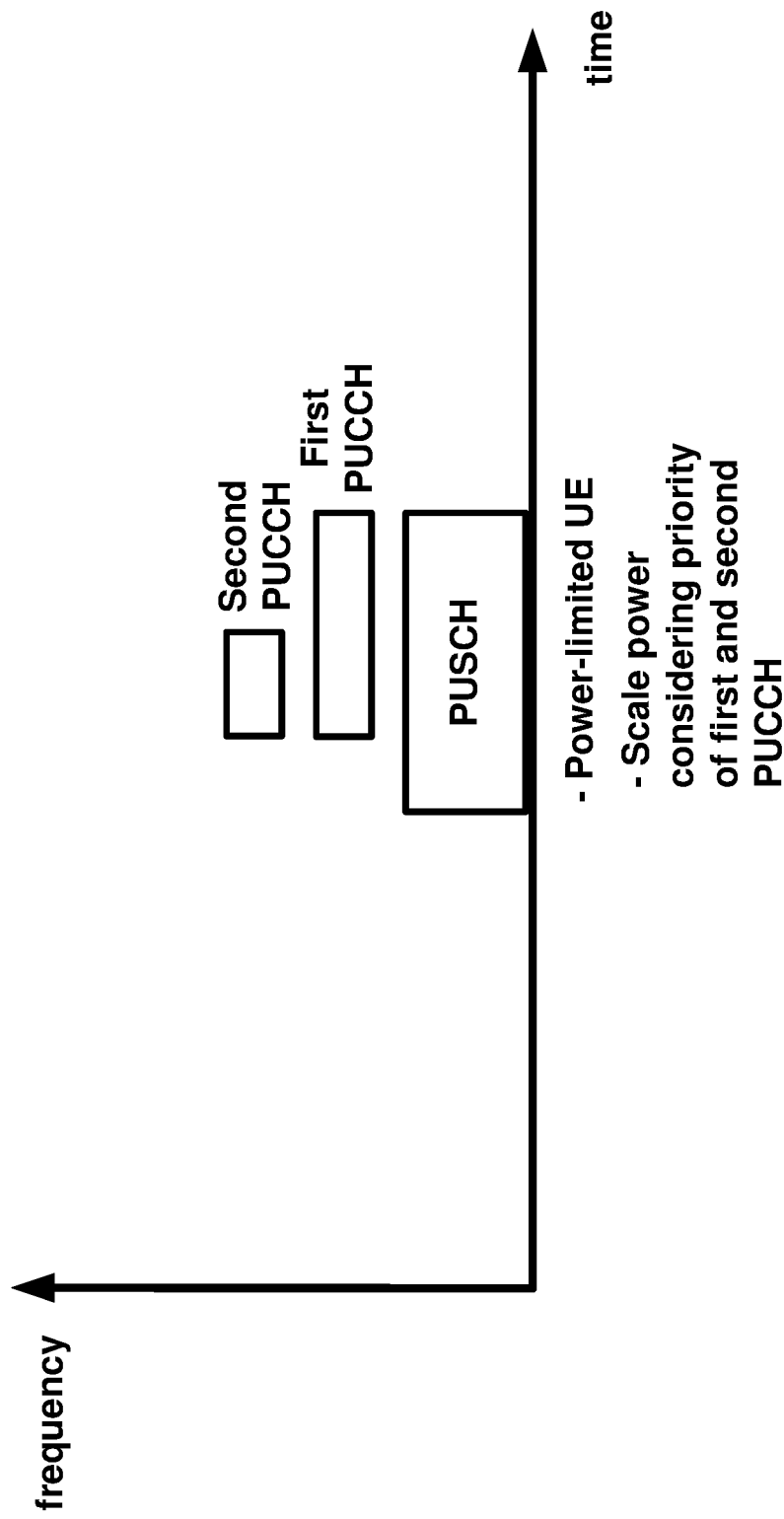
FIG. 15 is an example power scaling process as per an aspect of an embodiment of the present invention.

In an example embodiment, a wireless device may receive one or more messages. The one or more messages may comprise one or more RRC messages. The one or more RRC messages may comprise configuration parameters for one or more cells. In an example, the one or more cells may comprise a primary cell. In an example, the one or more cells may comprise a primary cell and one or more secondary cells. In an example, the one or more messages may comprise configuration parameters for one or more logical channels. In an example, a logical channel may correspond to a service type (e.g., eMBB, URLLC, mMTC, etc.). In an example, there may be mapping between logical channel/service type to a TTI/numerology. In an example, the one or more RRC messages may comprise configuration parameters for one or more physical uplink control channels (PUCCHs). In an example, the one or more PUCCHs may comprise one or more long PUCCHs and/or one or more short PUCCHs. A short PUCCH and a long PUCCH may carry different number of UCI and/or may have different capacity (e.g., in terms of number of bits). In an example, a PUCCH in the one or more PUCCH may correspond to a service type/logical channel/TTI/numerology. In an example, the one or more short PUCCHs may comprise short PUCCH(s) with different durations in time domain. In an example, the one or more short PUCCHs may comprise one or more two-symbol PUCCHs and/or one or more one-symbol PUCCHs. A one-symbol PUCCH may span one symbol in time domain. A two-symbol PUCCH may span two symbols in time domain. In an example, the wireless device may calculate transmission powers for a plurality of signals. The plurality of signals may be for transmission in a same first slot/subframe/TTI and on a same cell. The plurality signals may comprise one or more PUCCH and/or one or more PUSCH and/or one or more SRS, etc. In an example, the plurality of signals may have overlap in time domain. In an example, the plurality of signals may be multiplexed in frequency domain, e.g., may occupy different parts in the frequency domain and may have overlap in the time domain. In an example, the plurality of signals may comprise a first PUCCH and a second PUCCH. In an example, the first PUCCH and the second PUCCH may be multiplexed in time domain (e.g., TDMed). In an example, the first PUCCH and the second PUCCH may be multiplexed in frequency domain (e.g., FDMed). The first PUCCH and the second PUCCH may have overlap in the time domain. In an example, the first PUCCH and the second PUCCH and/or other signals may share a total transmission power (e.g., total transmission power for the cell). The wireless device may calculate transmission power of the plurality of signals employing power control algorithms. The power control algorithms may comprise open-loop power control algorithms and/or closed-loop power control algorithms. The base station may transmit one or more commands (e.g., using one or more DCI) and the wireless device may employ the one or more commands to calculate transmission power levels for the plurality of signals. In an example, the wireless device may be power-limited, e.g., the total calculated power for transmission of the plurality of signals may exceed a first limit. In an example, the first limit may be a maximum transmission power per cell. In an example, the wireless device may be power limited if the wireless device is located in the cell edge. In an example, the wireless device may scale calculated power level(s) of one or more signals in the plurality of signals in response to the wireless device being power-limited. In an example, the wireless device may scale the calculated power level(s) of one or more signals in the plurality of signals based on priorities associated with the plurality of signals. In an example, the wireless device may drop one or more first signals in the plurality of signals in response to the wireless device being power limited and the one or more signals having lower priority compared to other signals in the plurality of signals. An example scenario is shown in FIG. 15. The wireless device may transmit one or more signals of the plurality of signals with their calculated/scaled transmission power level in the first slot/subframe/TTI. In an example embodiment, in response to the wireless device being power limited, the wireless device may consider higher priority for the first PUCCH compared to the second PUCCH.

In a new radio (NR) wireless system, a plurality of PUCCHs may be multiplexed (e.g., frequency domain multiplexed) and may be transmitted in parallel. Legacy power control algorithms may not consider priorities associated with a plurality of PUCCHs for power scaling of the plurality of PUCCHs. The uplink control information (UCI) need to be transmitted with high reliability. Legacy power control processes may lead to inefficient transmission of UCI and may lead to inefficient system operation. Example embodiment enhance the power control process in NR. Example embodiments may be combined to further enhance the power control process, for example, in response to wireless device being power-limited and the wireless device transmits a plurality of PUCCHs in parallel.

In an example embodiment, the first PUCCH may be a short PUCCH and the second PUCCH may be a long PUCCH. The wireless device may consider a higher priority for the short PUCCH compared to the long PUCCH. The wireless device may consider the higher priority of the short PUCCH compared to the long PUCCH in power calculation of the short PUCCH and the long PUCCH and/or scaling of the power of the short PUCCH and the long PUCCH.

In an example embodiment, the first PUCCH may be a long PUCCH and the second PUCCH may be a short PUCCH. The wireless device may consider a higher priority for the long PUCCH compared to the short PUCCH. The wireless device may consider the higher priority of the long PUCCH compared to the short PUCCH in power calculation of the short PUCCH and the long PUCCH and/or scaling of the power of the short PUCCH and the long PUCCH.

In an example embodiment, the first PUCCH may be a two-symbol short PUCCH and the second PUCCH may be a one-symbol short PUCCH. The wireless device may consider a higher priority for the two-symbol short PUCCH compared to the one-symbol short PUCCH. The wireless device may consider the higher priority of the two-symbol short PUCCH compared to the one-symbol short PUCCH in power calculation of the two-symbol short PUCCH and the one-symbol short PUCCH and/or scaling of the power of the two-symbol short PUCCH and the one-symbol short PUCCH.

In an example embodiment, the first PUCCH may be a one-symbol short PUCCH and the second PUCCH may be a two-symbol short PUCCH. The wireless device may consider a higher priority for the one-symbol short PUCCH compared to the short-symbol short PUCCH. The wireless device may consider the higher priority of the one-symbol short PUCCH compared to the two-symbol short PUCCH in power calculation of the two-symbol short PUCCH and the one-symbol short PUCCH and/or scaling of the power of the two-symbol short PUCCH and the one-symbol short PUCCH.

In an example embodiment, the first PUCCH may carry one or more first UCI and the second PUCCH may carry one or more second UCI wherein the number of the one or more first UCI (e.g., first number of bits associated to the one or more first UCI) may be larger than the number of the one or more second UCI (e.g., second number of bits associated to the one or more second UCI). The wireless device may consider a higher priority for the PUCCH that may carry larger number of one or more UCI (e.g., larger number of bits associated to the one or more UCI). The wireless device may consider the higher priority of the first PUCCH compared to the second PUCCH (e.g., higher priority for the PUCCH that carries larger number of one or more UCI and/or larger number of bits associated with one or more UCI) in power calculation of the first PUCCH and the second PUCCH and/or scaling of the power of the first PUCCH and the second PUCCH.

In an example embodiment, the first PUCCH may be associated with and/or may carry UCI corresponding to one or more first service types/logical channels/TTIs/numerologies. The second PUCCH may be associated with and/or may carry UCI corresponding to one or more second service types/logical channels/TTIs/numerologies. In an example, the one or more first service types/logical channels/TTIs/numerologies may correspond to URLLC. In an example, the one or more second service types/logical channels/TTIs/numerologies may correspond to a non-URLLC service (e.g., eMBB). The wireless device may consider the higher priority of the first PUCCH compared to the second PUCCH (e.g., higher priority for the PUCCH that corresponds to the one or more first service types/logical channels/TTIs/numerologies) in power calculation of the first PUCCH and the second PUCCH and/or scaling of the power of the first PUCCH and the second PUCCH.

Figure 16:
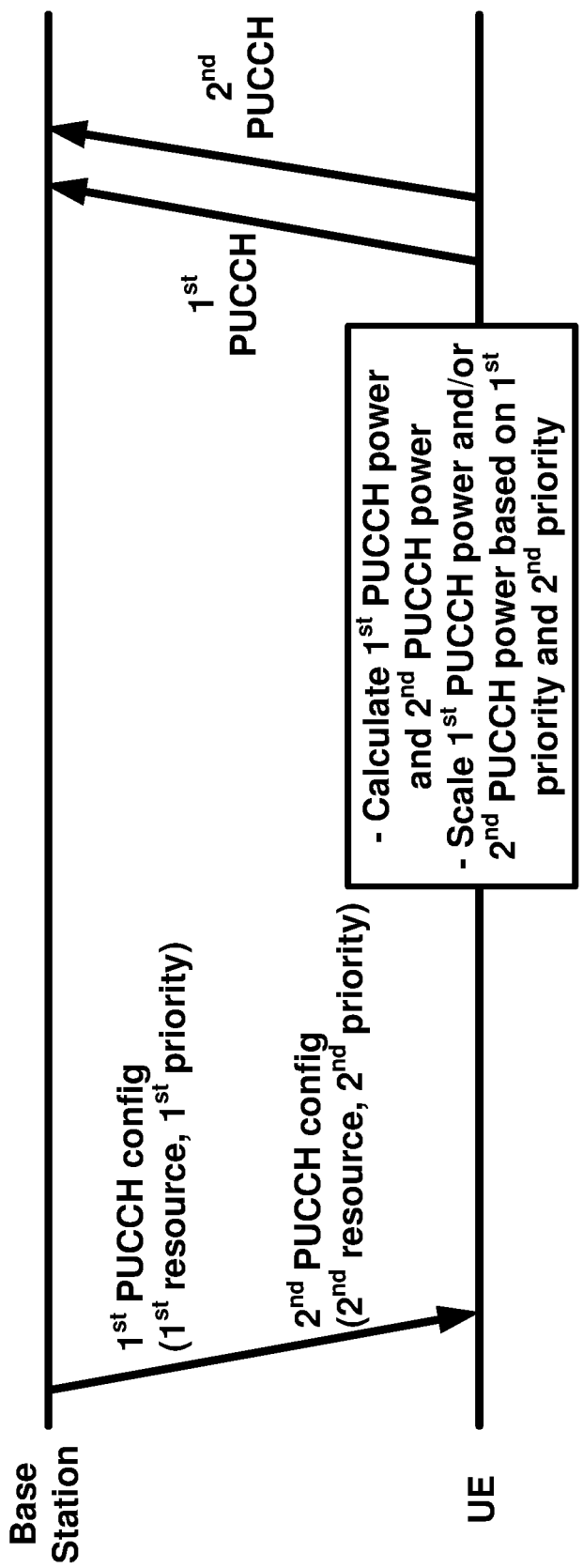
FIG. 16 is an example power scaling process as per an aspect of an embodiment of the present invention.
Figure 17:
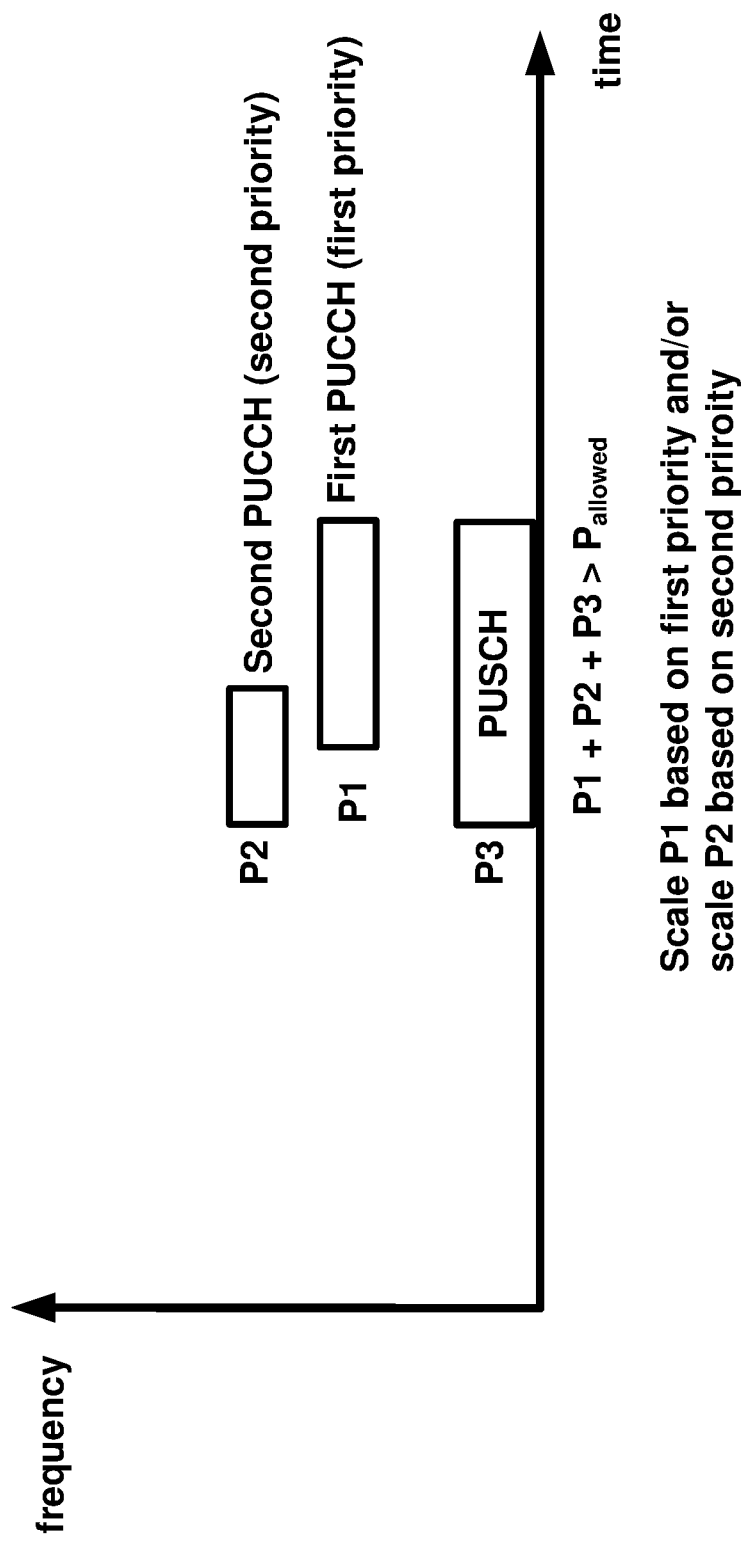
FIG. 17 is an example power scaling process as per an aspect of an embodiment of the present invention.

In an example embodiment, as shown in FIG. 16 and FIG. 17, a wireless device may receive one or more messages comprising configuration parameters. The one or more messages may comprise one or more RRC messages. In an example, the one or more messages may comprise configuration parameters for a first uplink control channel and a second uplink control channel. In an example, the one or more messages may indicate a first resource (e.g., radio resource) for a first uplink control channel of a cell and a second resource (e.g., radio resource) for a second uplink control channel of the cell. In an example, the first resource may comprise a first plurality of time domain (e.g., symbols) and frequency domain (e.g., RBs). In an example, the second resource may comprise a second plurality of time domain (e.g., symbols) and frequency domain (e.g., RBs). In an example, the first radio resource and the second radio resource may overlap in one or more symbol durations.

In an example, the first uplink control channel may have a first duration and the second uplink control channel may have a second duration.

In an example, the first duration may be longer than the second duration. In an example, the first priority may be higher than the second priority. In an example, the first duration may be longer than the second duration and the first priority may be higher that the second priority.

In an example, the first duration may be longer than the second duration. In an example, the second priority may be higher than the first priority. In an example, the first duration may be longer than the second duration and the second priority may be higher than the first priority.

In an example, the first uplink control channel may carry a first number of uplink control information and the second uplink control channel may carry a second number of uplink control information. In an example, the first number is larger than the second number. In an example, the first priority is higher than the second priority. In an example, the first number is larger than the second number and the first priority is higher than the second priority.

In an example, the first uplink control channel corresponds to one or more first logical channels and the second uplink control channel corresponds to one or more second logical channels. In an example, the first priority may be higher than the second priority in response to the one or more first logical channels being corresponding to a first service type. In an example, the first service type may be ultra reliable low latency communications.

In an example, the first uplink control channel may correspond to one or more first transmission durations and the second uplink control channel corresponds to one or more second transmission durations. In an example, the first priority may be higher than the second priority in response to one or more first logical channels being mapped to the one or more first durations.

In an example, the wireless device may determine a plurality of power levels for a plurality of signals/channels (e.g., uplink signals/channels). The plurality of power levels may comprise a first power level for transmission of one or more first uplink control information via the first resource (e.g., by the first uplink control channel) and a second power level for transmission of one or more second uplink control information via the second resource (e.g., by the second uplink control channel).

In an example, the wireless device may receive one or more downlink control information indicating one or more parameters, wherein a first power level in the plurality of power levels is calculated based on the one or more parameters. In an example, a first power level in the plurality of power levels may be calculated based on an open loop power control process. In an example, the first power level in the plurality of power levels may be calculated based on a closed loop power control process. In an example, a second power level in the plurality of power levels may be calculated based on a closed loop power control process.

In an example, the wireless device may determine that the wireless device is power limited. In an example the wireless device may determine that a sum of the plurality of power levels is larger than an allowed transmission power. In an example, the wireless device may determine that the wireless device is power limited in response to the sum of the plurality of power levels being larger than an allowed transmission power. In an example, the allowed transmission power may be a maximum wireless device transmission power. The wireless device may scale the first power level based on a first scaling factor, wherein the first scaling factor is determined based on a first priority of the first uplink control channel. In an example, the wireless device may scale the second power level based on a second scaling factor, wherein the second scaling factor is determined based on a second priority of the second uplink control channel. In an example, the wireless device may scale the first power level based on the first priority and/or the second priority. In an example, the wireless device may scale the second power level based on the first priority and/or the second priority. In an example, the wireless device may drop one or more signals in response to the sum of the plurality of power levels being larger than the allowed transmission power.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 18 is an example flow diagram as per an aspect of an embodiment of the present disclosure. At 1810, a wireless device may receive one or more messages. The one or more messages may indicate a plurality of resources comprising: a first resource for a first uplink control channel of a cell; and a second resource for a second uplink control channel of the cell. The first resource and the second resource may overlap in one or more symbol durations. At 1820, a plurality of power levels may be determined. The plurality of power levels may comprise: a first power level for transmission of one or more first uplink control information via the first resource; and a second power level for transmission of one or more second uplink control information via the second resource. At 1830, the first power level may be scaled based on a first scaling factor. The first scaling factor may be determined based on a first priority of the first uplink control channel. At 1840, the second power level may be scaled based on a second scaling factor. The second scaling factor may be determined based on a second priority of the second uplink control channel. A sum of the plurality of power levels may be larger than an allowed transmission power.

According to an example embodiment, the first uplink control channel may have a first duration and the second uplink control channel has a second duration. According to an example embodiment: the first duration may be longer than the second duration; and the first priority may be higher than the second priority. According to an example embodiment: the first duration may be longer than the second duration; and the second priority may be higher than the first priority. According to an example embodiment, the first uplink control channel may carry a first number of uplink control information and the second uplink control channel may carry a second number of uplink control information. According to an example embodiment, the first number may be larger than the second number; and the first priority may be higher than the second priority. According to an example embodiment, the first uplink control channel may correspond to one or more first logical channels and the second uplink control channel may correspond to one or more second logical channels. According to an example embodiment, the first priority may be higher than the second priority in response to the one or more first logical channels corresponding to a first service type. According to an example embodiment, the first service type may comprise ultra reliable low latency communications. According to an example embodiment, the first uplink control channel may correspond to one or more first transmission durations and the second uplink control channel may correspond to one or more second transmission durations. According to an example embodiment, the first priority may be higher than the second priority in response to one or more first logical channels being mapped to the one or more first durations. According to an example embodiment, the allowed transmission duration may be a maximum wireless device transmission power. According to an example embodiment, the first uplink control channel may have a first duration and the second uplink control channel has a second duration. According to an example embodiment, the first duration may be longer than the second duration; and the first priority may be higher than the second priority. According to an example embodiment, the first duration may be longer than the second duration; and the second priority may be higher than the first priority. According to an example embodiment, the first uplink control channel may carry a first number of uplink control information and the second uplink control channel may carry a second number of uplink control information. According to an example embodiment, one or more downlink control information may be received. The one or more downlink control information may indicate one or more parameters. A first power level in the plurality of power levels may be calculated based on the one or more parameters. According to an example embodiment, a first power level in the plurality of power levels may be calculated based on an open loop power control process. According to an example embodiment, a first power level in the plurality of power levels may be calculated based on a closed loop power control process. According to an example embodiment, one or more signals may be dropped in response to the sum of the plurality of power levels being larger than the allowed transmission power.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   receiving, by a wireless device, one or more messages indicating a plurality of resources comprising:
      a first resource for a first uplink control channel of a cell; and
      a second resource for a second uplink control channel of the cell, wherein the first resource and the second resource overlap in one or more symbol durations;
   determining a plurality of power levels comprising:
      a first power level for transmission of one or more first uplink control information via the first resource; and
      a second power level for transmission of one or more second uplink control information via the second resource;
   scaling the first power level based on a first scaling factor, wherein the first scaling factor is determined based on a first priority of the first uplink control channel;

scaling the second power level based on a second scaling factor, wherein the second scaling factor is determined based on a second priority of the second uplink control channel; and wherein a sum of the plurality of power levels is larger than an allowed transmission power.

2. The method of claim 1, wherein the first uplink control channel has a first duration and the second uplink control channel has a second duration.

3. The method of claim 2, wherein:
the first duration is longer than the second duration; and
the first priority is higher than the second priority.

4. The method of claim 2, wherein:
the first duration is longer than the second duration; and
the second priority is higher than the first priority.

5. The method of claim 1, wherein the first uplink control channel carries a first number of uplink control information and the second uplink control channel carries a second number of uplink control information.

6. The method of claim 5, wherein:
the first number is larger than the second number; and
the first priority is higher than the second priority.

7. The method of claim 1, wherein the first uplink control channel corresponds to one or more first logical channels and the second uplink control channel corresponds to one or more second logical channels.

8. The method of claim 7, wherein the first priority is higher than the second priority based on the one or more first logical channels corresponding to a first service type.

9. The method of claim 8, wherein the first service type is ultra reliable low latency communications.

10. The method of claim 1, wherein the first uplink control channel corresponds to one or more first transmission durations and the second uplink control channel corresponds to one or more second transmission durations.

11. The method of claim 10, wherein the first priority is higher than the second priority based on one or more first logical channels being mapped to the one or more first transmission durations.

12. The method of claim 1, wherein the allowed transmission power is a maximum wireless device transmission power.

13. The method of claim 12, wherein the first uplink control channel has a first duration and the second uplink control channel has a second duration.

14. The method of claim 13, wherein:
the first duration is longer than the second duration; and
the first priority is higher than the second priority.

15. The method of claim 13, wherein:
the first duration is longer than the second duration; and
the second priority is higher than the first priority.

16. The method of claim 12, wherein the first uplink control channel carries a first number of uplink control information and the second uplink control channel carries a second number of uplink control information.

17. The method of claim 1, further comprising receiving one or more downlink control information indicating one or more parameters, wherein the first power level in the plurality of power levels is determined based on the one or more parameters.

18. The method of claim 1, wherein the first power level in the plurality of power levels is determined based on an open loop power control process.

19. The method of claim 1, wherein the first power level in the plurality of power levels is determined based on a closed loop power control process.

20. The method of claim 1, further comprising dropping one or more signals in response to the sum of the plurality of power levels being larger than the allowed transmission power.

* * * * *